US012565924B2

(12) United States Patent
Matenda et al.

(10) Patent No.: US 12,565,924 B2
(45) Date of Patent: Mar. 3, 2026

(54) PASSIVE CALIBRATION OF A MECHATRONIC DEVICE MATED TO A CONTINUOUSLY VARIABLE PLANETARY (CVP) HUB

(71) Applicant: enviolo B.V., Amsterdam (NL)

(72) Inventors: Marko Matenda, Bjelovar (HR); Brad Pohl, Leander, TX (US); Thomas William Ryan, IV, Leander, TX (US)

(73) Assignee: enviolo B.V., Amsterdam (NL)

( * ) Notice: Subject to any disclaimer, the term of this patent is extended or adjusted under 35 U.S.C. 154(b) by 0 days.

(21) Appl. No.: 19/058,970

(22) Filed: Feb. 20, 2025

(65) Prior Publication Data

US 2025/0189017 A1     Jun. 12, 2025

Related U.S. Application Data

(63) Continuation of application No. 18/434,607, filed on Feb. 6, 2024, now Pat. No. 12,234,892, which is a
(Continued)

(51) Int. Cl.
*F16H 15/50*          (2006.01)
*F16H 59/04*          (2006.01)
(Continued)

(52) U.S. Cl.
CPC ........... *F16H 15/50* (2013.01); *F16H 59/044* (2013.01); *F16H 59/06* (2013.01);
(Continued)

(58) Field of Classification Search
CPC ........ F16H 15/50; F16H 59/044; F16H 59/06; F16H 61/0213; F16H 2061/6641; F16H 2342/02
See application file for complete search history.

(56) References Cited

U.S. PATENT DOCUMENTS 4,774,858  A      10/1988  Ganoung
2007/0288148  A1   12/2007  Cui
(Continued)

FOREIGN PATENT DOCUMENTS

CN          107044538  A      8/2017
CN          213954277  U      8/2021
(Continued)

*Primary Examiner* — Edwin A Young
(74) *Attorney, Agent, or Firm* — Sheppard Mullin Richter & Hampton LLP

(57)          ABSTRACT

A continuous variable planetary (CVP) system includes a CVP hub, which includes a shift mechanism including a shift driver element, and a processing server system to calibrate the CVP system and detect errors within the CVP system. The processing server system performs continuously monitoring or obtaining a transmission speed ratio of the CVP hub. Upon detecting that the transmission speed ratio reaches a particular value, the processing server system records a corresponding position of the shift driver. The processing server system calibrates the CVP system based on the particular value, the corresponding position, and a known relationship between transmission speed ratios and positions of the shift mechanism. The processing server system determines or verifies a full underdrive (FUD) position by iteratively reducing a transmission speed ratio from the particular value until an onset of a backlash condition is detected and determines or verifies a full overdrive (FOD) position.

18 Claims, 45 Drawing Sheets

Related U.S. Application Data continuation of application No. 18/143,050, filed on May 3, 2023, now Pat. No. 11,906,018.

(60) Provisional application No. 63/337,872, filed on May 3, 2022.

(51) Int. Cl.
*F16H 59/06*       (2006.01)
*F16H 61/02*       (2006.01)
*F16H 61/664*      (2006.01)

(52) U.S. Cl.
CPC . F16H 61/0213 (2013.01); *F16H 2061/6641* (2013.01); *F16H 2342/02* (2013.01)

(56)               References Cited

U.S. PATENT DOCUMENTS

| | | | |
|---|---|---|---|
| 2009/0112416 | A1 | 4/2009 | Heap |
| 2009/0132135 | A1 | 5/2009 | Quinn, Jr. |
| 2017/0082193 | A1 | 3/2017 | David |
| 2017/0138471 | A1 | 5/2017 | Vu |
| 2017/0268638 | A1* | 9/2017 | Nichols ................. F16H 61/664 |
| 2017/0327184 | A1 | 11/2017 | Contello |
| 2017/0328453 | A1 | 11/2017 | Mckinzie |
| 2018/0079416 | A1 | 3/2018 | Damman |
| 2018/0328473 | A1 | 11/2018 | David |
| 2019/0040951 | A1 | 2/2019 | David |
| 2020/0271201 | A1* | 8/2020 | Nichols ................... F16H 15/28 |

FOREIGN PATENT DOCUMENTS

| | | | |
|---|---|---|---|
| JP | 200174132 A | 3/2001 | |
| JP | 2001074132 | 3/2001 | |
| JP | 2016196963 A | 11/2016 | |
| JP | 2018030423 A | 3/2018 | |
| KR | 1019980080525 A | 11/1998 | |
| KR | 1019980080526 A | 11/1998 | |
| KR | 1020180101519 A | 9/2018 | |
| KR | 1020180107180 A | 10/2018 | |
| WO | 2017058862 | 4/2017 | |
| WO | 2018129444 A1 | 7/2018 | |

* cited by examiner

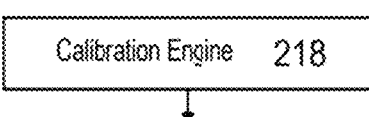

| Calibration Engine | 218 |

Active End Stop Detection FOD

Approach to m_FOD and setting SD_FOD:      Max rate is a function of SD or SR. — 1704
       The higher the SD/SR If upshifting (increasing SD position) and the actuator stalls.     the slower it goes for example:
Allow actuator to stall @+7Nm for 0.5 seconds, set m_FOD = SD_Pos    SR <= 1.2, then per AHI Capacity
Backup 1°ΔSD,set S_FOD=SD_Pos,     Setting SR > 1.2, then +20°/s, -45°/s
Hold for 3 seconds and measure, set SR_FOD = avg((SD_Meas))

If the hub is URB
If SR_FOD < 1.4, then SD_FOD has an expiration time of 15 seconds, then is no longer enforced
lw_sr_count = +1
If 1.4<SR_FOD<1.5 then SD_FOD has an expiration time of 30 seconds, then is no longer enforced
mid_sr_count = +1
If 1.5<SR_FOD then SD_FOD holds until the next calibration cycle.
max_sr_count = +1 , and mid_sr_count = 0

If the hub is CT
If SR_FOD < 1.4, then SD_FOD has an expiration time of 15 seconds, then is no longer enforced
lw_sr_count = +1
If 1.4<SR_FOD<1.7 then SD_FOD has an expiration time of 30 seconds, then is no longer enforced
mid_sr_count = +1
If 1.7<SR_FOD then SD_FOD holds until the next calibration cycle.
max_sr_count = +1 , and mid_sr_count = 0

If the hub is TR
If SR_FOD < 1.4, then SD_FOD has an expiration time of 15 seconds, then is no longer enforced
lw_sr_count = +1
If 1.4<SR_FOD<1.86 then SD_FOD has an expiration time of 30 seconds, then is no longer enforced
mid_sr_count = +1
If 1.86<SR_FOD then SD_FOD holds until the next calibration cycle.
max_sr_count = +1 , and mid_sr_count = 0

If the hub is HD/EXTM
If SR_FOD < 1.4, then SD_FOD has an expiration time of 15 seconds, then is no longer enforced
lw_sr_count = +1
If 1.4<SR_FOD<1.86 then SD_FOD has an expiration time of 30 seconds, then is no longer enforced
mid_sr_count = +1
If 1.86<SR_FOD then SD_FOD holds until the next calibration cycle.
max_sr_count = +1 , and mid_sr_count = 0 if lw_sr_count >= 5, then send "message", then reset the counter
if mid_sr_count >= 5, then send "message", then reset the counter
if max_sr_count >=5, then do nothing

FIG. 17B

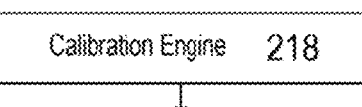

Calibration Engine    218

Active End Stop Detection FUD

Approach to m_FUD and setting SD_FUD:

If downshifting (decreasing SD position), and the actuator stalls
Allow actuator to stall @-7Nm for 0.5 seconds, set m_FUD = SD_Pos
Backup 1°ΔSD, set S_FUD = SD_Pos,
Hold for 3 seconds and measure, set SR_FUD = avg({SD_Meas})

Max rate is a function of SD or SR.
The lower the SD/SR
the slower it goes for example:
SR >= 0.75, then AHI Capacity
Setting SR < 0.75, then +45°/s,
-20°/s If the hub is URB
If SR_FUD > 0.75, then SD_FUD has an expiration time of 15 seconds, then is no longer enforced
If 0.55 <= SR_FUD <= 0.75 then SD_FUD has an expiration time of 30 seconds, then is no longer enforced
If 0.55 > SR_FUD then SD_FUD holds until the next calibration cycle.

If the hub is CT
If SR_FUD > 0.75, then sFUD has an expiration time of 15 seconds, then is no longer enforced
If 0.50 <= SR_FUD <= 0.75 then sFUD has an expiration time of 30 seconds, then is no longer enforced
If 0.50 > SR_FUD then sFUD holds until the next calibration cycle.

If the hub is TR
If SR_FUD > 0.75, then sFUD has an expiration time of 15 seconds, then is no longer enforced
If 0.50 <= SR_FUD <= 0.75 then sFUD has an expiration time of 30 seconds, then is no longer enforced
If 0.50 > SR_FUD then sFUD holds until the next calibration cycle.

If the hub is HD/EXTM
If SR_FUD > 0.75, then sFUD has an expiration time of 15 seconds, then is no longer enforced
If 0.50 <= SR_FUD <= 0.75 then sFUD has an expiration time of 30 seconds, then is no longer enforced
If 0.50 > SR_FUD then sFUD holds until the next calibration cycle.

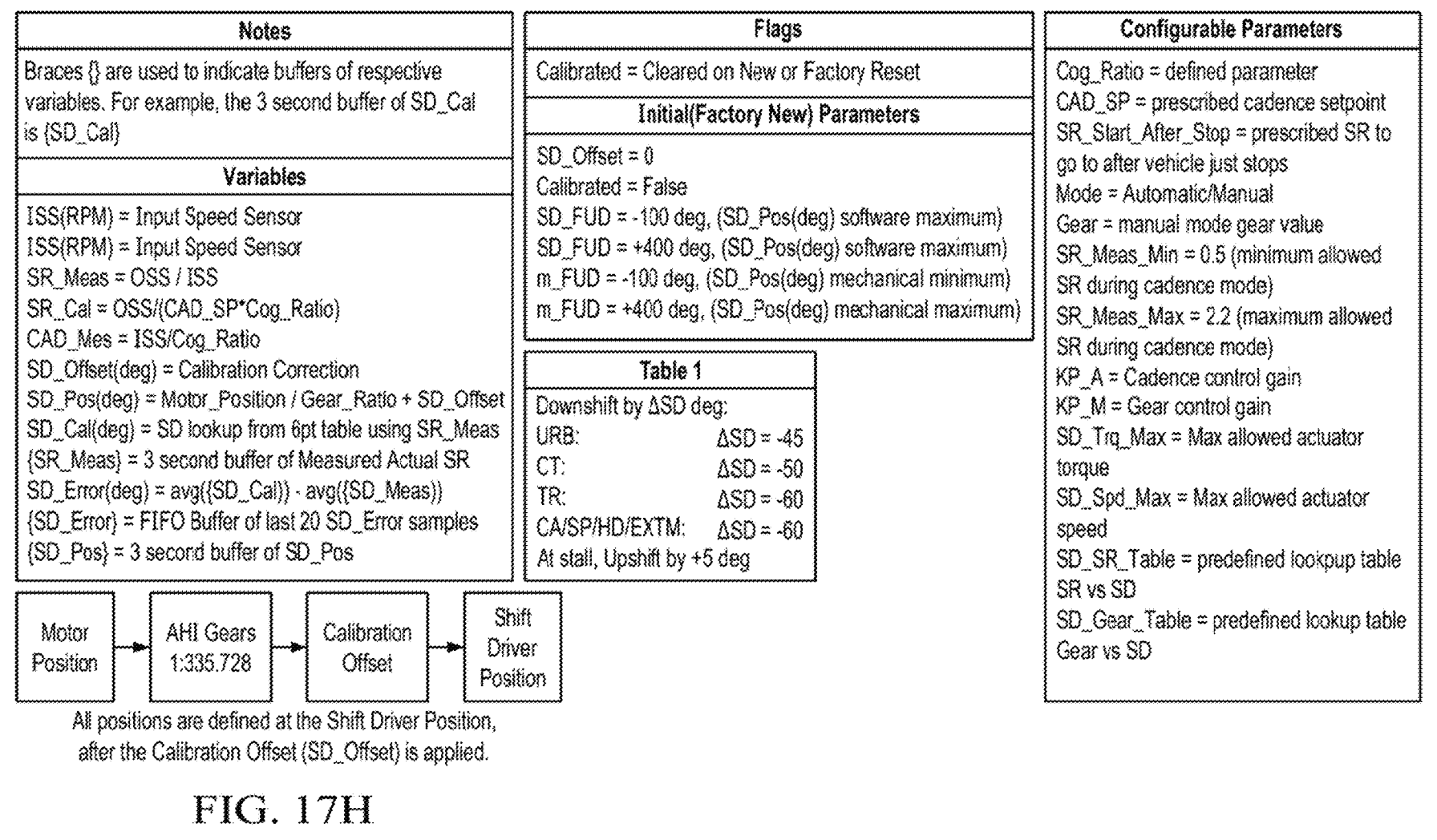

Notes

Braces {} are used to indicate buffers of respective variables. For example, the 3 second buffer of SD_Cal is {SD_Cal}

Variables

ISS(RPM) = Input Speed Sensor
ISS(RPM) = Input Speed Sensor
SR_Meas = OSS / ISS
SR_Cal = OSS/(CAD_SP*Cog_Ratio)
CAD_Mes = ISS/Cog_Ratio
SD_Offset(deg) = Calibration Correction
SD_Pos(deg) = Motor_Position / Gear_Ratio + SD_Offset
SD_Cal(deg) = SD lookup from 6pt table using SR_Meas
{SR_Meas} = 3 second buffer of Measured Actual SR
SD_Error(deg) = avg({SD_Cal}) - avg({SD_Meas})
{SD_Error} = FIFO Buffer of last 20 SD_Error samples
{SD_Pos} = 3 second buffer of SD_Pos

Flags

Calibrated = Cleared on New or Factory Reset

Initial(Factory New) Parameters

SD_Offset = 0
Calibrated = False
SD_FUD = -100 deg, (SD_Pos(deg) software maximum)
SD_FUD = +400 deg, (SD_Pos(deg) software maximum)
m_FUD = -100 deg, (SD_Pos(deg) mechanical minimum)
m_FUD = +400 deg, (SD_Pos(deg) mechanical maximum)

Configurable Parameters

Cog_Ratio = defined parameter
CAD_SP = prescribed cadence setpoint
SR_Start_After_Stop = prescribed SR to go to after vehicle just stops
Mode = Automatic/Manual
Gear = manual mode gear value
SR_Meas_Min = 0.5 (minimum allowed SR during cadence mode)
SR_Meas_Max = 2.2 (maximum allowed SR during cadence mode)
KP_A = Cadence control gain
KP_M = Gear control gain
SD_Trq_Max = Max allowed actuator torque
SD_Spd_Max = Max allowed actuator speed
SD_SR_Table = predefined lookup table SR vs SD
SD_Gear_Table = predefined lookup table Gear vs SD

Table 1

Downshift by ΔSD deg:
URB:            ΔSD = -45
CT:             ΔSD = -50
TR:             ΔSD = -60
CA/SP/HD/EXTM:  ΔSD = -60
At stall, Upshift by +5 deg Motor Position → AHI Gears 1:335.728 → Calibration Offset → Shift Driver Position All positions are defined at the Shift Driver Position, after the Calibration Offset (SD_Offset) is applied.

FIG. 17H

Calibration
Engine
218

Calibration
Method
1801

1802 — Continuously measuring or obtaining a transmission speed
ratio during pedaling of a vehicle 1804 — Determining a shift driver position at a transmission speed
ratio that is outside of a backlash region and between the FOD
and FUD positions 1806 — Recording the shift driver position 1808 — Determining FUD and FOD positions

PASSIVE CALIBRATION OF A MECHATRONIC DEVICE MATED TO A CONTINUOUSLY VARIABLE PLANETARY (CVP) HUB

PRIORITY CLAIM

This application is a continuation of U.S. patent application Ser. No. 18/434,607, filed Feb. 6, 2024, entitled "Passive Calibration of A Mechatronic Device Mated to a Continuously Variable Planetary (CVP) Hub," which is a continuation of U.S. patent application Ser. No. 18/143,050, filed May 3, 2023, entitled "Passive Calibration of a Mechatronic Device Mated to a Continuously Variable Planetary (CVP) Hub," now U.S. Pat. No. 11,906,018, which claims the benefit of U.S. Provisional Application No. 63/337,872, filed May 3, 2022, entitled "Passive Calibration Of A Mechatronic Device Mated To A Continuously Variable Planetary (CVP) Hub." The above-referenced applications are hereby incorporated by reference in their entirety.

TECHNICAL FIELD

This invention relates generally to calibration of a vehicular mechatronic device, and more particularly provides systems and methods for passive calibration of a continuously variable planetary (CVP) system in vehicles such as bicycles.

BACKGROUND

Calibration of a CVP system encompasses setting absolute positions of a mechatronic device. These absolute positions may include, for example, full underdrive (FUD), full overdrive (FOD), and a mid-ratio, which is a position that represents a halfway point between the FUD and FOD positions. Moreover, calibration involves obtaining transmission speed ratios, which are indicative of the extent of any underdrive or overdrive condition. However, current methods of calibration may involve excessive human interaction and/or be time consuming. Therefore, improving calibration would provide for not only an improved user experience but also enhance accuracy of the process.

SUMMARY

A hub interface, such as an Automatic Hub Interface (AHI), is involved in calibration and other related processes of a CVP system. Although the foregoing focuses on a CVP system, the techniques presented may also apply for vehicles that include an automatic shifting system and an integrated motor and transmission while utilizing a non-CVP hub. Factors that require individual calibration for each CVP system may be attributed to slight imperfections in manufacturing of every CVP hub and CVP system, as well as aging of a CVP hub. In particular, each hub may be manufactured within a certain tolerance which results in slightly differing behaviors and useful gear ratios or allowed useful travel of the CVP shift mechanism. Calibration is required because, upon assembly, reassembly, or reindexing an automatic hub interface (AHI) to CVP shift mechanism, the actuator, which is part of the AHI, lacks knowledge of any limits, or physical end stops, of the CVP shift mechanism and/or a FUD or FOD position. Therefore, without calibration, the actuator (AHI) would continuously cause the shift mechanism to be hitting its physical end stops and potentially overloading the end stops by applying excessive force, which would result in damage to the CVP hub, shift mechanism or automatic hub interface (e.g., the AHI) mated to the CVP hub. In some examples, the actuator actuates or rotates the shift driver (an element of the CVP shift mechanism), which in turn encourages the CVP transmission speed ratio to vary. Calibration can also establish a basic relationship between a position of a shift driver that controls a position of a carrier, such as a C1 or input carrier, and a transmission speed ratio, also referred to as a speed ratio. The transmission speed ratio may be indicative of a ratio between input and output transmission speeds. This calibration process is done in a passive manner that does not interfere with, or has minimal interference with, a user, and requires little to no user input. This calibration process may be performed during normal use and operation of a bicycle.

In particular, during such a process, upon the AHI switching from an off state to an on state, or detecting a reindexing event, the AHI may downshift as far as possible, detect a stalling event, and back off or upshift by a certain rotation amount, such as approximately 30 degrees, to compensate for backlash. This rotation amount may be based on an assumption that a backlash range is approximately 30 degrees, according to a converted range. The converted range may result from a mechanism such as a four-bar mechanism which converts or amplifies an original rotation of a carrier of about 8 degrees into 120 degrees of a shift driver element that is part of the shift mechanism. For a different conversion mechanism, a backlash range may be different. The backlash may be caused by this conversion or amplification of rotation of the C1 carrier using a four-bar mechanism. At this point, the CVP hub may be at or near a full underdrive (FUD) position, at which a transmission speed ratio is approximately 0.5. The AHI may detect hub rotational motion which may occur in response to a human pedaling or moving the vehicle. Upon detection of at least a threshold amount of hub rotational motion, the AHI may initiate an upshifting process. The threshold amount of hub rotational motion may be one pedal stroke, or any applicable number or range of pedal strokes. This upshifting process may include increasing a transmission speed ratio until the AHI detects that the transmission speed ratio is approximately 0.8, for example, in a range of between 0.7 and 0.9, 0.6 to 1, 0.55 to 1.05, or any suitable range that is sufficiently far from the backlash region but not excessively high to avoid strenuous or uncomfortable pedaling. The transmission speed ratio may be detected via speed sensors. Within several pedal strokes, such as between three to five pedal strokes, the AHI may be able to determine such a speed ratio. The AHI may then verify an actual transmission speed ratio and record a corresponding shift driver position. The AHI may convert the shift driver position to a value, and leverage a known relationship between speed ratio and shift driver position to estimate shift stops, such as in scenarios that are open loop speed ratio control, such as coasting mode or manual mode. The conversion of the shift driver position may be based on a formula, lookup table, or relationship that the shift driver position equals 100 times the transmission speed ratio minus 50. Thus, a shift driver FUD position (also referred to as a FUD position, FUD stop, or FUD stop position), corresponding to a software stop and right before an onset of backlash, is around 30 degrees away from a shift driver position corresponding to a transmission speed ratio of 0.8. Meanwhile, a shift driver end stop position, which includes the backlash region and may correspond to a mechanical end stop, is around 60 degrees away from a shift driver position corresponding to a transmission speed ratio of 0.8, account for a backlash of around 30 degrees. These differences of 30 degrees and 60 degrees are according to the converted range following the aforementioned 4-bar mechanism conversion. In some examples, leveraging this transmission speed ratio and shift driver position pair, as well as a table or known relationship between transmission speed ratio and shift driver position, the AHI may calibrate the CVP system (CVP plus shift mechanism plus AHI) without a three-point calibration, thereby resulting in a shorter calibration process and avoiding going to overdrive.

In some examples, the AHI may further detect or verify software stops corresponding to a software FOD (SFOD) and software FUD (SFUD), which correspond to FOD and FUD positions. The AHI may actively monitor a shift driver position compared to a transmission speed ratio during a user riding the vehicle to determine at which shift driver position backlash commences. For example, when the transmission speed ratio is greater than 0.5, upon the AHI detecting uniform pedaling, the AHI may rotate the shift driver towards a FUD position. Upon detecting that an incremental change in a shift driver rotation does not result in an incremental decrease in speed ratio, the AHI may detect an onset of backlash. The onset of backlash is a point of a lowest speed ratio of the CVP and may be considered as a FUD position for the shift driver. The AHI may record this position as a software stop, which may be sufficiently far from the mechanical end stop, which includes the backlash. Using the prediction of a backlash, the AHI may avoid entering into a range of shift driver positions in which backlash exists. Conversely, the AHI may detect an exit of backlash, at a point at which a given change in shift driver position results in a change in transmission speed ratio, whereas previously no change in transmission speed ratio resulted.

In order to detect full overdrive (FOD), the AHI may monitor a current rise while rotating the shift driver towards FOD. If current is increasing but transmission speed ratio remains constant, at that point, the FOD is reached. The AHI may record the FOD as another software stop. The benefits of such a detection of software stops at FOD and FUD include a utilization of a completely available ratio range for that specific CVP, a unnecessary reduction of shift driver rotation during backlash, an ability to detect reindexing events without involving a user, and avoiding calibration until an initial time at which the user begins riding the vehicle.

An additional aspect of passive calibration involves active learning, in which the AHI may continuously monitor a relationship between transmission speed ratio and shift driver position. If an error between a currently monitored relationship and a known or benchmark relationship exceeds some threshold, the AHI may infer that a reindexing, assembly, reassembly, or an out-of-phase event has occurred, and/or detect an error, and thereby recalibrate or reinitiate the calibration process. Additionally, the AHI may perform error detection by continuously monitoring for potential deterioration of the CVP over time. For example, the AHI may detect a decrease in transmission speed ratio range over time.

In some embodiments, the present invention provides a continuous variable planetary (CVP) system including a CVP hub, which includes a shift mechanism (including a shift driver element), and a processing server system to calibrate the CVP system and detect errors within the CVP system. The processing server system performs continuously monitoring or obtaining a transmission speed ratio of the CVP hub during adjustment or preservation of the transmission speed ratio of the CVP hub; upon detecting that the transmission speed ratio reaches a particular speed ratio value, recording a corresponding mechanism position of the shift mechanism; calibrating the CVP system based on the particular speed ratio value, or the corresponding mechanism position, and a known relationship between transmission speed ratios and positions of the shift mechanism; determining or verifying a full underdrive (FUD) position by iteratively reducing the transmission speed ratio from the particular value until an onset of a backlash condition is detected; determining or verifying a full overdrive (FOD) position by iteratively increasing a motor current applied by the AHI until the transmission speed ratio stops increasing; and implementing the CVP system according to the determined FUD and the determined FOD positions, wherein the implementing of the CVP system comprises stopping or reversing a direction of the shift mechanism upon reaching the FUD position or the FOD position.

In some embodiments, the onset of the backlash condition corresponds to a point in which a motion of the shift driver in a first direction fails to result in a decrease of the transmission speed ratio and a motion of the shift driver in a second direction opposite of the first direction results in an increase of the transmission speed ratio.

In some embodiments, the processing server system comprises an Automatic Hub Interface (AHI).

In some embodiments, the continuously monitoring or obtaining the transmission speed ratio is in response to the CVP hub being in a backlash region corresponding to the FUD.

In some embodiments, the continuously monitoring or obtaining the transmission speed ratio is in response to detecting an absence of a previous calibration record.

In some embodiments, the determined FOD position corresponds to an onset of a saturation region.

In some embodiments, the instructions when executed by the one or more hardware processors are further configured to perform determining a relationship between a shift mechanism position and the transmission speed ratio according to the particular speed ratio value and the corresponding mechanism position, and respective positions of the shift mechanism at the FUD position and the FOD position; determining any deviation from the determined relationship, or a pre-prescribed relationship during operation of the CVP system; and upon determining a deviation, adding an offset to the relationship.

In some embodiments, the corresponding position of the shift driver is between the FOD position and the FUD position.

In some embodiments, the particular value is between 0.7 and 0.9.

In some embodiments, the continuously monitoring or obtaining of the transmission speed ratio comprises obtaining the transmission speed ratio from a first sensor corresponding to an input interface of the CVP and from a second sensor corresponding to an output interface of the CVP.

In some embodiments, the present invention provides a method of calibrating a continuous variable planetary (CVP) system comprising a CVP hub that comprises a shift mechanism (including a shift driver element) and an actuator (e.g., part of the AHI). The method comprises continuously monitoring or obtaining a transmission speed ratio of the CVP hub during adjustment or preservation of the CVP hub speed ratio; upon detecting that the transmission speed ratio reaches a particular speed ratio value, recording a corresponding mechanism position of the shift mechanism; calibrating the CVP system based on the particular value, the corresponding shift mechanism position, and a known relationship between transmission speed ratios and positions of the shift mechanism; determining or verifying a full underdrive (FUD) position by iteratively reducing a transmission speed ratio from the particular value until an onset of a backlash condition is detected; determining or verifying a full overdrive (FOD) position by iteratively increasing a motor current applied by the AHI until the transmission speed ratio stops increasing; and implementing the CVP system according to the determined FUD and the determined FOD positions, wherein the implementing of the CVP system comprises stopping or reversing a direction of the shift mechanism upon reaching the FUD position or the FOD position.

In some embodiments, the continuously monitoring or obtaining the transmission speed ratio of the CVP hub is in response to a reindexing event (where the AHI is re-clocked relative to the CVP shift mechanism).

In some embodiments, a method calibrates a continuous variable planetary (CVP) system comprising a CVP hub that comprises a shift mechanism, the shift mechanism including a shift driver element, and a processing server system. The method comprises: detecting a CVP system state and executing a pre-prescribed sequence of motions of the shift mechanism including a shift driver element; upon completion of the pre-prescribed sequence of motions, prescribing a shift mechanism position value; continuously monitoring or obtaining of the transmission speed ratio and by way of comparison of a shift mechanism actual position value to a pre-defined relationship to speed ratio, determining an error; and offsetting the shift mechanism actual position value based on the error.

In some embodiments, the continuously monitoring or obtaining of the shift mechanism stall/saturation condition determines software FUD (SFUD) or software FOD (SFOD) by performing active end-stop detection; and the method further comprises: by way of the processing server system and continuously monitoring CVP speed ratio, set speed ratio based constraints including but not limited to time based limits or expiration dates to SFUD or SFOD.

In some embodiments, continuously monitoring of the CVP system calibration state sets system parameters; and when the CVP system state is in calibration, setting or increasing the torque and speed capacity of the Automatic Hub Interface (AHI).

In some embodiments, the pre-prescribed sequence of motions of the shift mechanism is in response to detecting an absence of a previous calibration record.

In some embodiments, the continuously monitoring or obtaining the Automatic Hub Interface (AHI) power cycling event occurs; when Automatic Hub Interface (AHI) has a power cycling event, temporary system constraints are applied and calibration parameters are reset; when Automatic Hub Interface (AHI) power cycling occurs, Automatic Hub Interface (AHI) torque and speed capacity limits are applied. A power cycling event may include a sequence in which a power is on, then turned off, then turned on again. The calibration parameters may include software stops.

In some examples, the shift mechanism position value excludes a motion.

In some examples, the processing server system performs a pre-prescribed sequence of motions contingent on the state of the CVP system (power on/off/on or factory new). The processing server system monitors CVP hub speed ratio and by way of comparing actual shift mechanism position to a pre-prescribed speed ratio based "lookup" value, derives and corrects shift mechanism position value. The processing server system continuously monitors the state of the shift mechanism state and controls and regulates shift mechanism travel limits (active end stop detection and correction). The processing server system continuously monitors the state of the CVP system and manages the torque and speed capacity of the AHI, which includes state based software stops (shift mechanism travel soft limits) with time based expiration limits These and other aspects of the AHI and CVP may be described in more detail below.

BRIEF DESCRIPTION OF THE DRAWINGS

FIGS. 17A-17H are flowcharts illustrating modes of error detection, active end stop detection at FOD, FUD, manual mode, cadence mode, and start after stop operations, in accordance with some embodiments of the present invention.

Any relevant principles in any of the FIGS. may be applicable to other FIGS. For example, any relevant principles in FIG. 1A-1F may be applicable to FIGS. 2-12, 13A-13C, 14A-14C, 15A-15D, and 16A-16C, 17A-17H, 18, and 19.

DETAILED DESCRIPTION

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

Figure 1A:
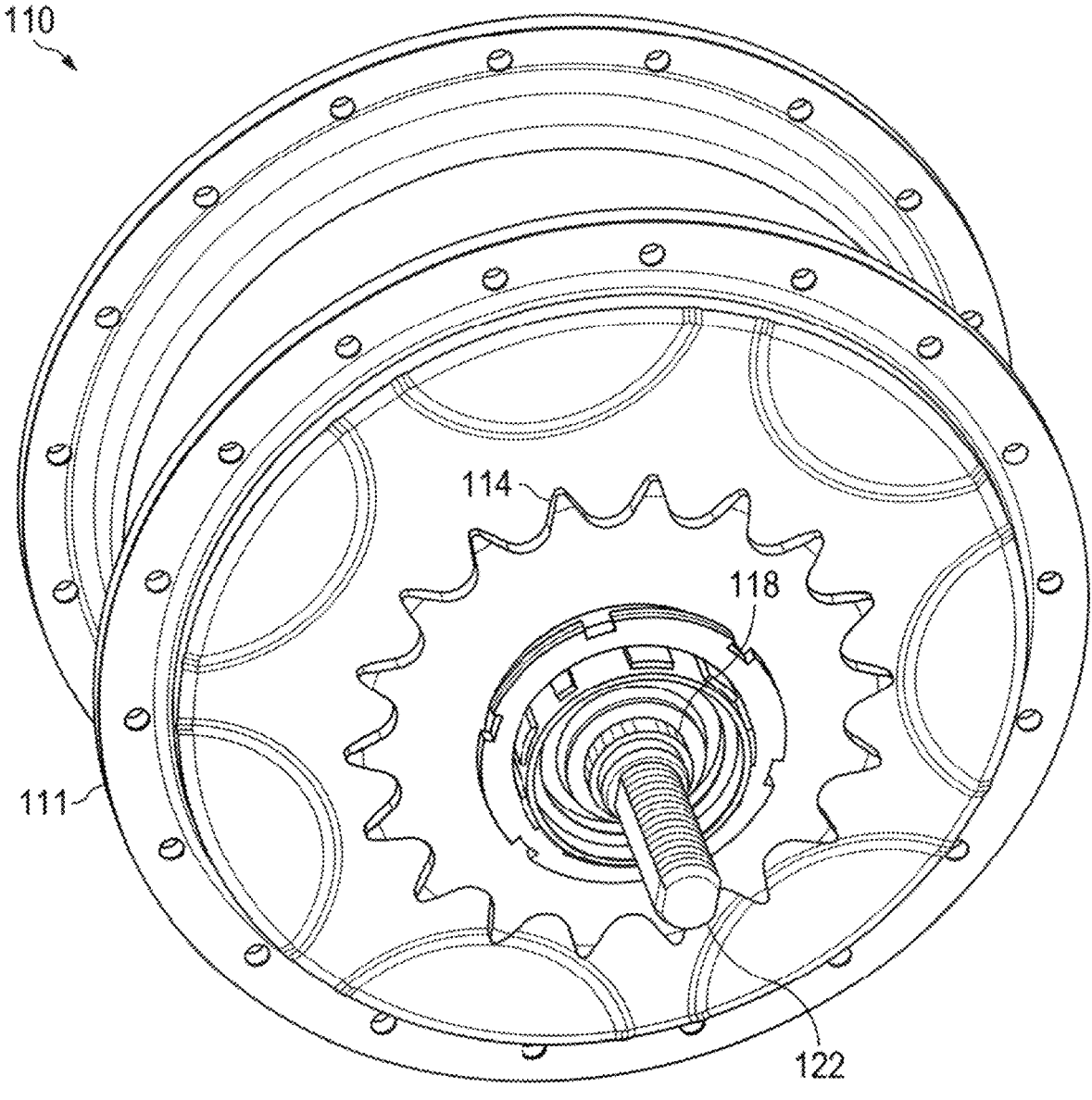
FIGS. 1A-1D are diagrams illustrating example continuous variable planetary (CVP) hubs upon which calibration and other operations are to be performed, in accordance with some embodiments of the present invention.

FIGS. 1A-1F illustrate exemplary continuous variable planetary (CVP) hubs, upon which an automatic hub interface (AHI) may be mated to calibrate the CVP system. Although some of the features in FIGS. 1A-1F may differ from one another and may differ from actual implementation, FIGS. 1A-1F are applicable to illustrate a mechanical concept of how a shift driver may change a transmission speed ratio in various mechanical embodiments. In FIG. 1A, a CVP hub 110 or portion thereof includes a housing 111 that encloses components of the CVP hub 110, a coupling 114 such as a sprocket, a shift driver 118, and an axle 122. The shift driver 118 may rotate between different angles, which may correspond to different angles of a carrier (not shown in FIG. 1A). These different angles may be mapped to or correspond to different transmission speed ratios of the CVP hub 110.

Figure 1B:
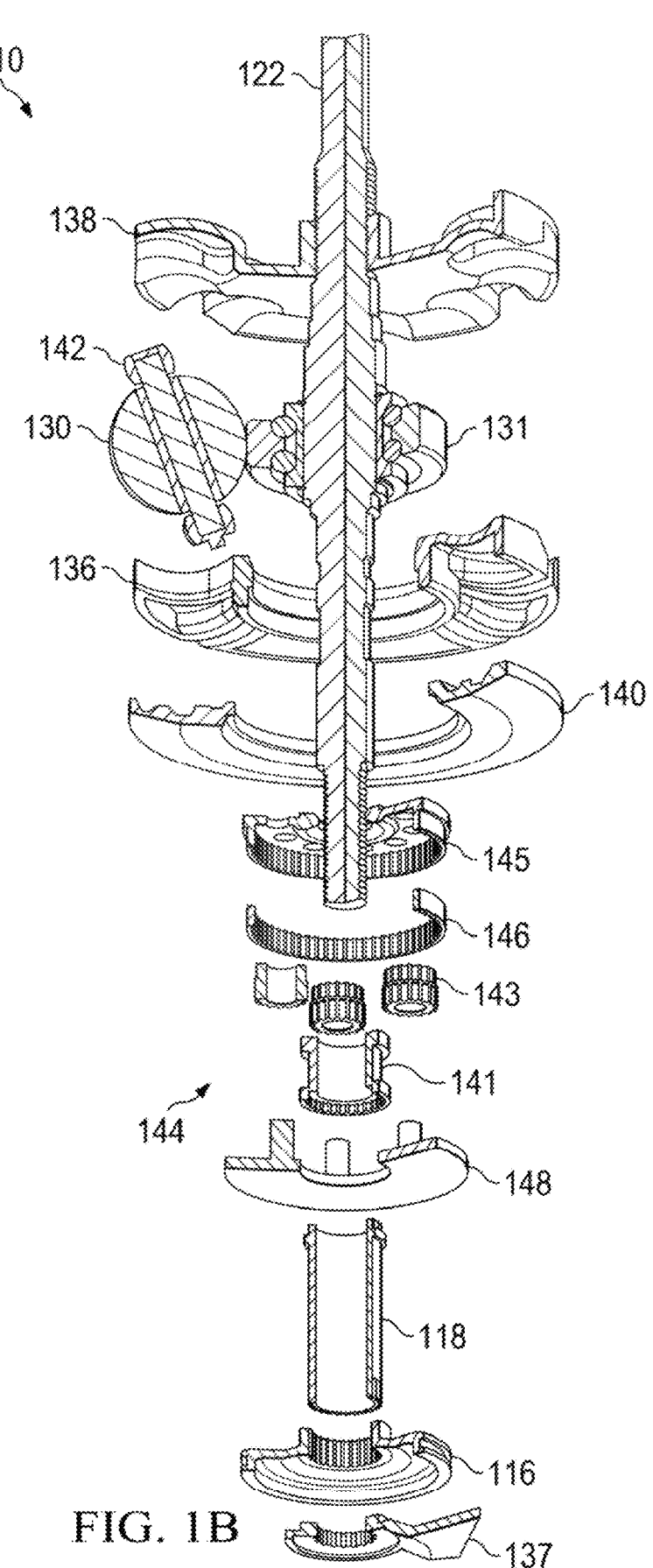

FIG. 1B illustrates additional components of the CVP hub 110, including the shift driver 118 which may be coupled to a pulley 116 and a reaction arm 137, which may be attached to a frame (e.g., a bicycle frame) via a shaft 122. Planets 130 may be rotatable in unison about a planet axle 142. A shift in transmission speed ratio between input speed and output speed, and consequently, a shift in a ratio of input torque to output torque, may be accomplished by tilting of the rotational axis of the planets 130. In some examples, the tilting of the rotational axes of the planets 130 may be accomplished by rotating a first stator 136 with respect to a second stator 138. Each planet 130 may contact an idler 131 disposed radially inward of a respective planet 130. In some examples, the CVP hub 110 may include a timing plate 140 coupled to one end of the planet axles 142. The timing plate 140 may synchronize a timing of the planets 130. A stator driver assembly 144 may be coupled to the shift driver 118. The stator driver assembly 144 may include a carrier 148, which may be coupled to the timing plate 140. The carrier 148 may also couple to the planetary gears 143. A number of teeth and pitch of a sun gear 141, the planetary gears 143, and ring gears 145 and 146 may be sized to provide a particular desired rotation of the first stator 136.

Figure 1C:
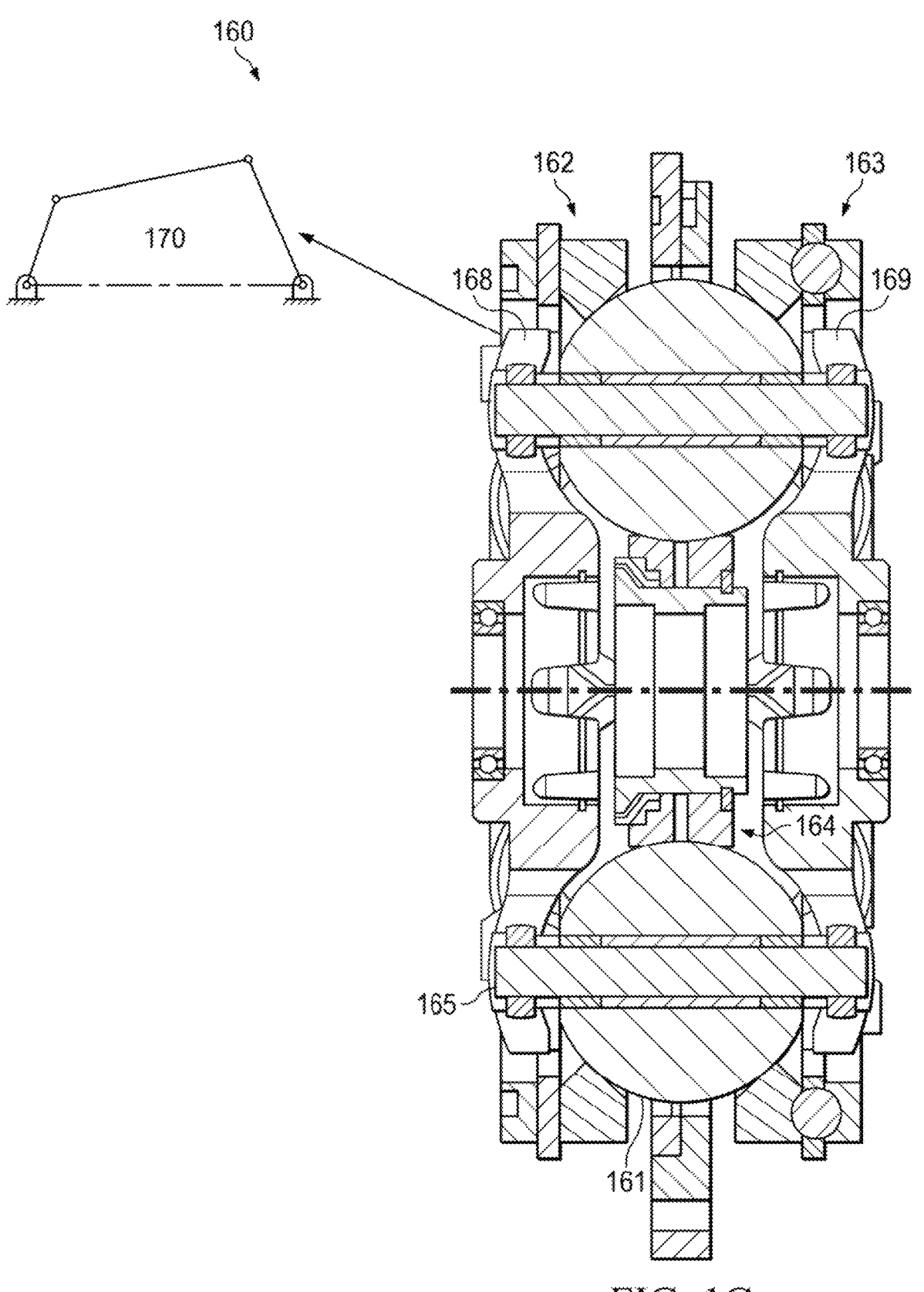

FIG. 1C illustrates an exemplary CVP hub 160 including a number of planets 161, two ring assemblies in contact with the planets 161, an input traction ring 162, an output traction ring 163, and an idler or sun assembly 164. The planets 161 may be mounted on tiltable axles 165, which may be held in a carrier assembly having a first carrier, such as a C1 carrier, 168, and a second carrier, or a C2 carrier, 169. In some examples, the first carrier 168 may be provided with guide slots, and the second carrier 169 may be provided with radially offset guide slots. The tiltable axles 165 may be adjusted to achieve a desired transmission speed ratio, and adjusting of the tiltable axles 165 may involve controlling an angular alignment of the first carrier member 168 and the second carrier member 169.

Within or associated with the CVP hub 160 may be a four-bar mechanism 170 that acts as a force multiplier shift mechanism and converts a rotation of approximately 8 degrees of the C1 carrier 166 into a rotation of about 120 degrees. Thus, an original range of approximately 8 degrees indicates an extent between the FOD position and the FUD position, and is equivalent to a converted range of about 120 degrees. In other words, in some embodiments, a position difference between the FOD position and a FUD position spans approximately 8 degrees of carrier rotation. The four-bar mechanism 170 may include a pin and a slot. The four-bar mechanism 170 may cause backlash as a result of the conversion. This backlash may be approximately 30 degrees with respect to the underdrive side and approximately 8 degrees with respect to the overdrive side, according to the converted range. For different conversion mechanisms which may convert the original rotation range of 8 degrees into a different range, the backlash may be different from the current situation.

Figure 1D:
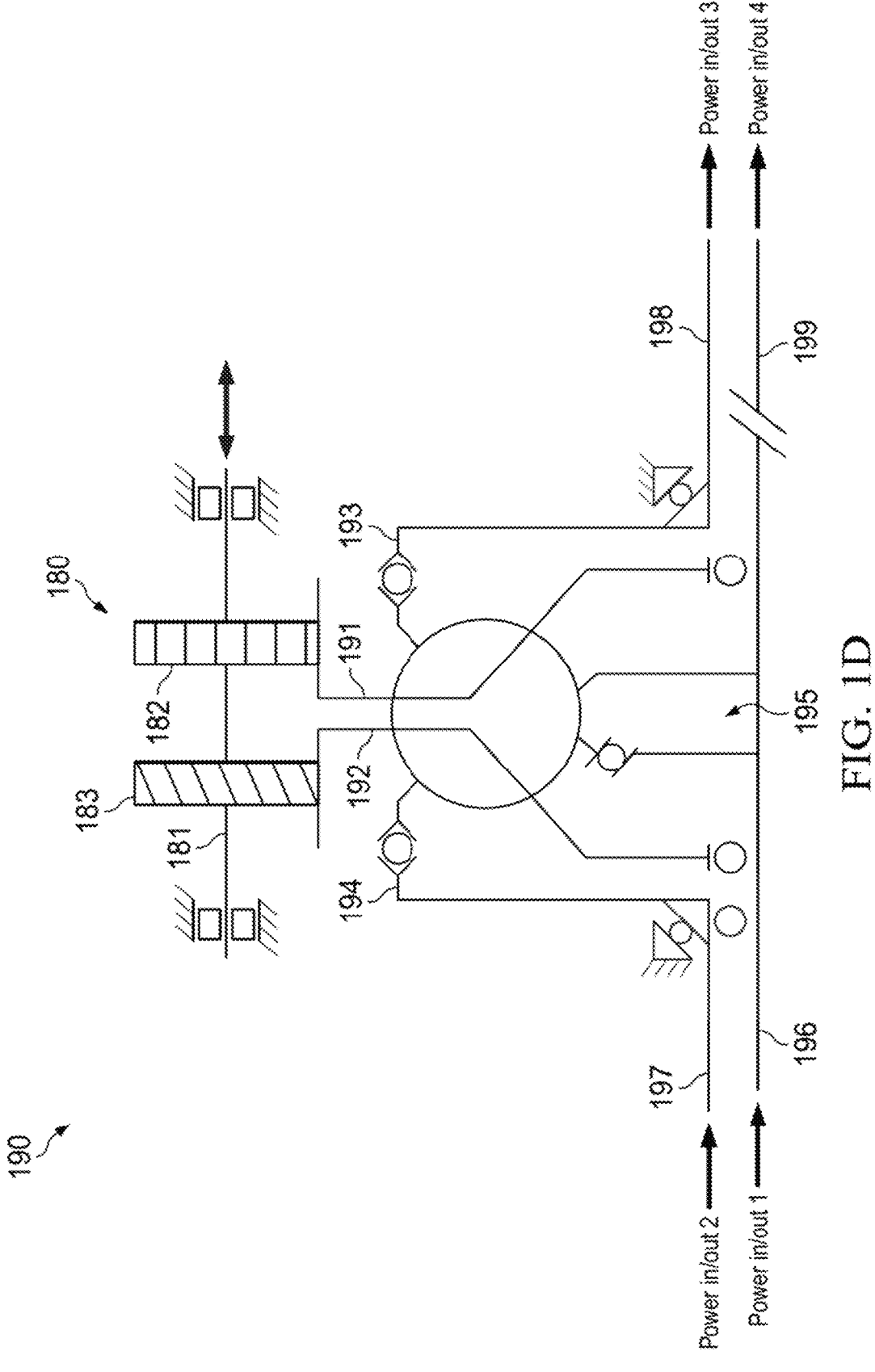

FIG. 1D illustrates a CVP hub 190 which has a first carrier member 191, a second carrier member 192, a first traction ring assembly 193, a second traction ring assembly 194, which are each in contact with tiltable planets. A sun assembly 195 may be arranged radially inward of the tiltable balls, the first traction ring assembly 193, and the second traction ring assembly 194. The CVP hub 190 includes a first rotatable shaft 196 coupled to the sun assembly 195, and a second rotatable shaft 197 coupled to the second traction ring assembly 194. In some examples, the CVP hub 190 includes third and fourth rotatable shafts 198 and 199. The CVP hub 190 also includes a shift mechanism 180 coupled to the first carrier member 191 and the second carrier member 192 to adjust the tiltable planets. The shift mechanism 180 includes a shift driver shaft 181, a first helical gear 182 that may be coupled to the first carrier member 191 and a second helical gear 183 may be coupled to the second carrier member 192.

Figure 1E:
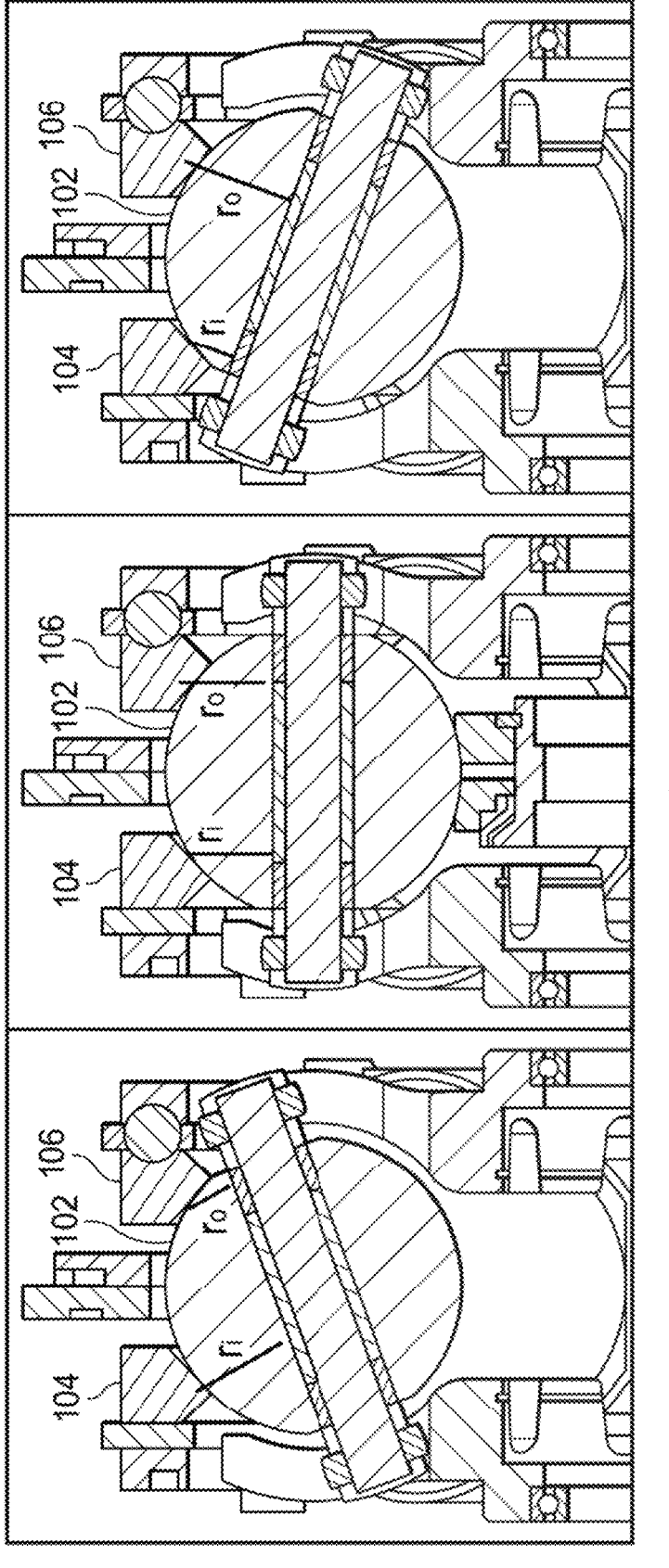
FIG. 1E is a diagram illustrating an example of an underdrive and overdrive condition in a CVP hub, in accordance with some embodiments of the present invention.

FIG. 1E illustrates exemplary underdrive, 1:1, and overdrive conditions. By tilting the axle of a planet 102 which may be implemented, for example, as the planets 161 in FIG. 1C, or the planets 130 in FIG. 1B, a radius of contact $r_i$ between the planet 102 and an input ring 104, as well as a radius of contact $r_o$ between the planet 102 and an output ring 106, is modified. Thus, a ratio of the radius of contact $r_i$ between input and output traction rings is modified. When $r_i$ exceeds $r_o$, an underdrive condition is exhibited. When $r_o$ exceeds $r_i$, an overdrive condition is exhibited. When $r_i$ equals $r_o$, then a 1:1 condition is exhibited.

Figure 1F:
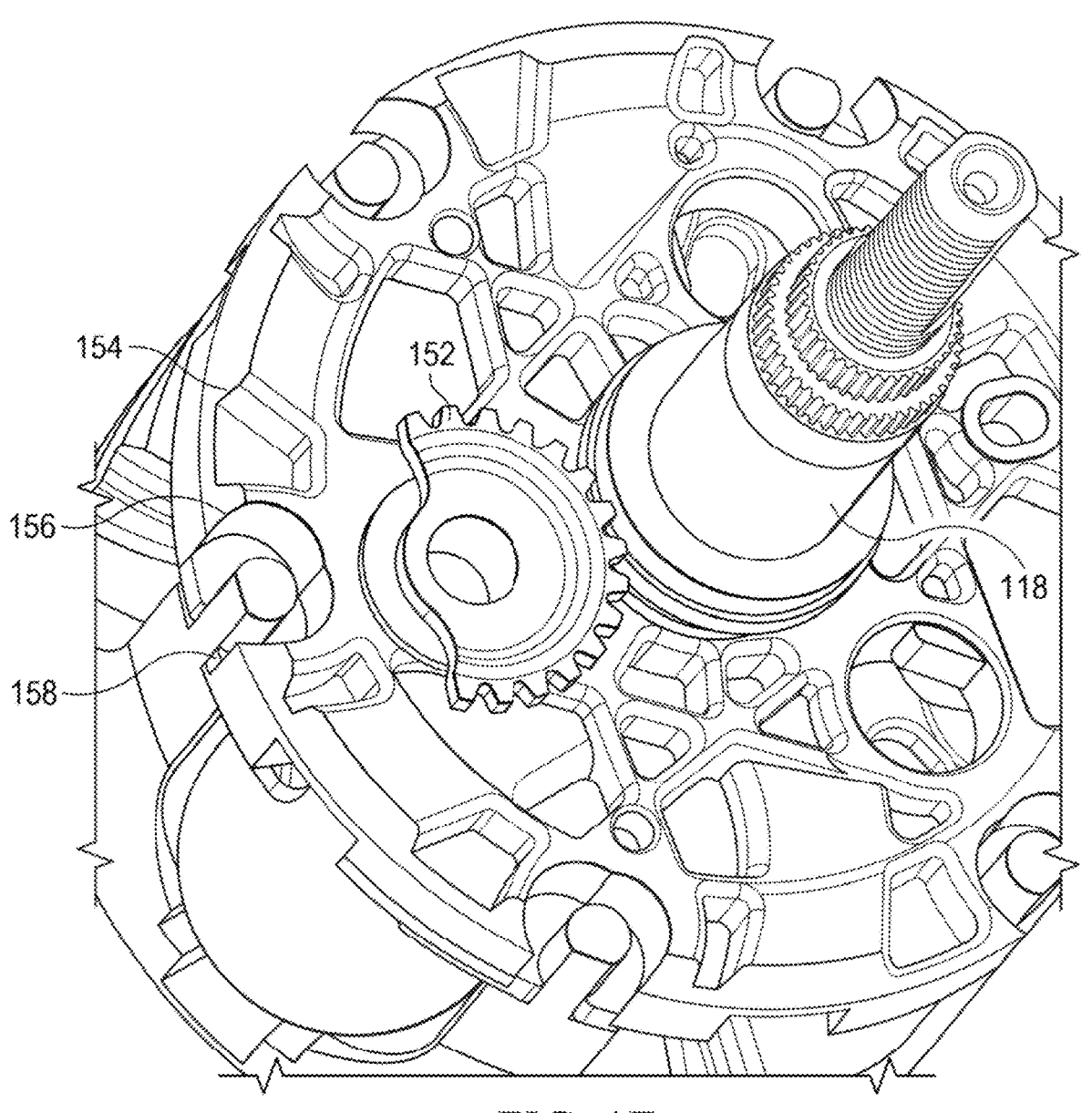
FIG. 1F is a diagram illustrating an example CVP shift mechanism and further illustrates positions of carrier stops, in accordance with some embodiments of the present invention.

FIG. 1F illustrates a C1 FUD stop 158, which is a FUD stop position of a C1 carrier, a C1 FOD stop 156, which is a FOD stop position of the C1 carrier, a C1 carrier 154, a four bar (pin in slot) mechanism 152, and an element of the four bar mechanism called a shift driver 118. 152 and 118 are elements of the four bar mechanism 170 illustrated in FIG. 1C.

Figure 2:
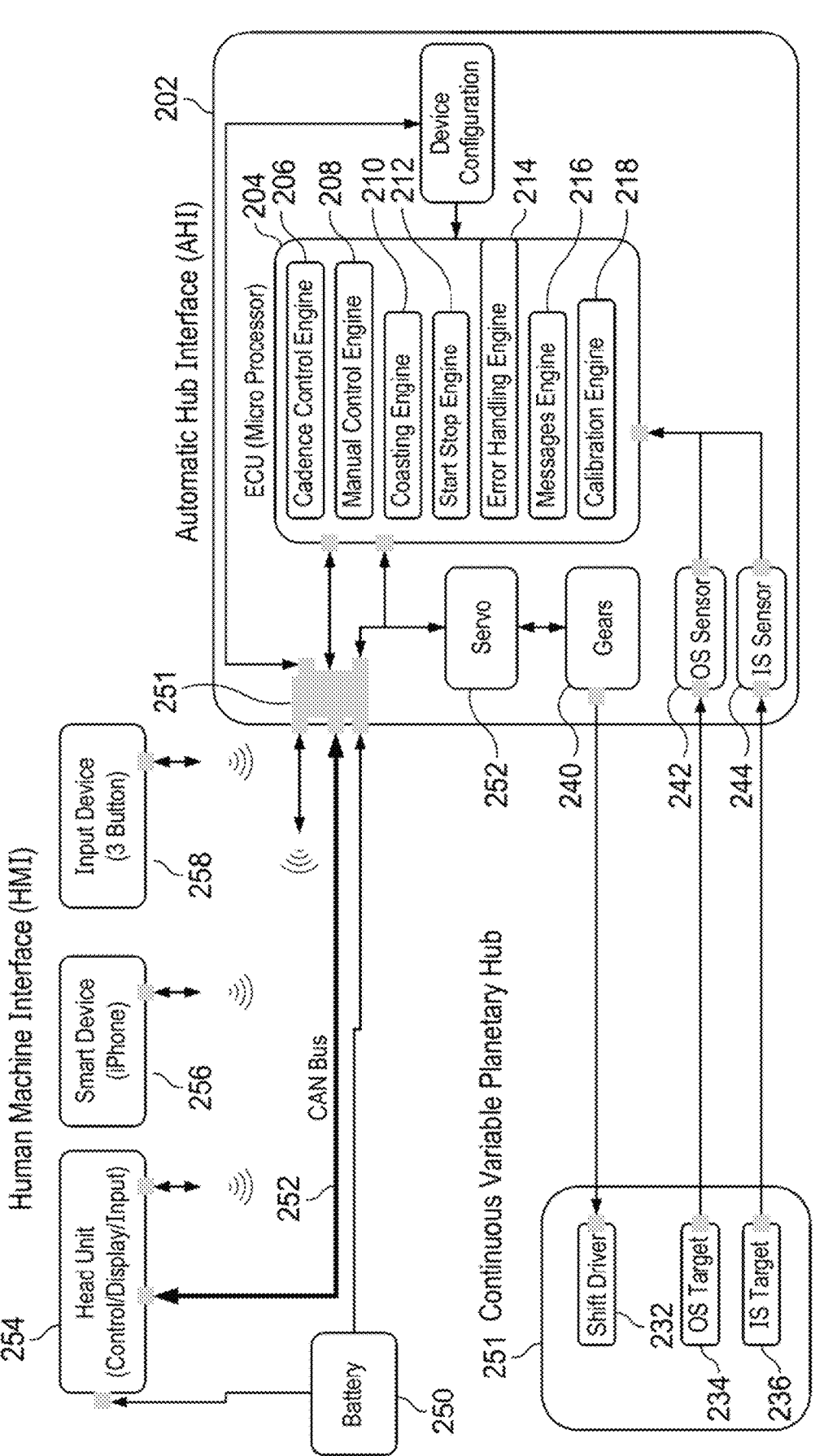
FIG. 2 is a block diagram illustrating a CVP system showing an automatic hub interface (AHI) mated to the CVP hub, the AHI coordinating calibration of the CVP system and other operations, in accordance with some embodiments of the present invention.

FIG. 2 is a diagram in which an automatic hub interface (AHI) 202 is mated to a continuous variable planetary (CVP) hub 251, in accordance with some embodiments of the present invention. The AHI 202 may control and/or coordinate various operations of the CVP hub 251, including calibration of the system that is formed when AHI 202 is combined with CVP hub 251. The CVP hub 251 may be implemented as any of the CVP hubs illustrated in FIGS. 1A-1D and 1F, such as the CVP hub 110 in FIG. 1A or 1B, the CVP hub 160 in FIG. 1C, or the CVP hub 190 in FIG. 1D. As illustrated in FIGS. 1A-1D and 1F, the CVP hub 251 may include a shift driver 232. The shift driver 232 may be implemented as any of the shift driver 118 in FIG. 1A or 1B or the shift driver 181 in FIG. 1D. Output Speed (OS) readings from an output interface sensor target 234 and OS Sensor 242, and Input Speed (IS) readings from an input shaft interface sensor target 236 and IS Sensor 244 may be fed into the AHI 202. The AHI 202 may include a servo 252 such as a position-controlled electro mechanical servo that can run continuously forward and reverse, to attain a rotation of the shift driver 232 of approximately 120 degrees, according to the converted range, gears 240, and an electronic control unit (ECU) microprocessor 204. The ECU microprocessor 204 may include a cadence control engine 206, a manual control engine 208, a coasting engine 210, a start stop engine 212, an error handling engine 214, a messages engine 216, and a calibration engine 218. The ECU microprocessor 204 may receive information from the servo 252, the gears 240, the OS sensor 242, and the IS sensor 244. The AHI 202 may receive electric power from a battery 250 via a connector 251, and may receive and/or transmit information to and/or from user devices, via a Controller Area Network (CAN) bus 252, a communications interface, and/or Applications Programming Interfaces (APIs). The user devices may include a head unit 254, a smart device 256, and an input device 258. The smart device 256 may encompass any device such as a laptop, mobile phone, tablet, desktop computer, car entertainment/radio system, game console, smart television, set-top box, smart appliance or general edge-computing device. The user devices may be part of a computer network. The computer network may include any wide area network, local area network, wireless area network, private network, public network and/or the particular wide area network commonly referred to as the Internet.

The ECU microprocessor 204 may be connected to the user devices via a cellular and/or radio frequency (RF) channel and/or electromagnetic (EM) connection and/or other channel. The connection may encompass technologies such as home WiFi, public WiFi, WiFi (Wireless Fidelity), BLE (Bluetooth Low Energy), and IEEE (Institute of Electrical and Electronics Engineers) 802.15.4 protocols such as Zigbee (Zonal Intercommunication Global-standard, where Battery life is long, which is Economical to deploy, and which exhibits Efficient use of resources), ISA100.11a (Internet Society of Automation 100.11a), WirelessHART (Highway Addressable Remote Transducer Protocol), MiWi (Microchip Wireless), 6LoWPAN (IPv6 over Low-Power Wireless Personal Area Networks), Thread, and SNAP (Subnetwork Access Protocol), and/or the like). Functions of the ECU microprocessor 204, which may be implemented as one or more processors, one or more servers, or one or more processing servers, will be explained in more detail in the subsequent FIGS.

The AHI interface 202 may operate either in an open loop or a closed loop mode. In a closed loop, when a value is obtained, an error is also measured and fed back to the system that generated the value, and in future iterations, the error is compensated for. The feedback may be from one or more speed sensors. Meanwhile, in an open loop, no feedback is obtained. An open loop may be implemented during coasting, when no speed sensors are receiving any readings, or in manual mode.

Figure 3:
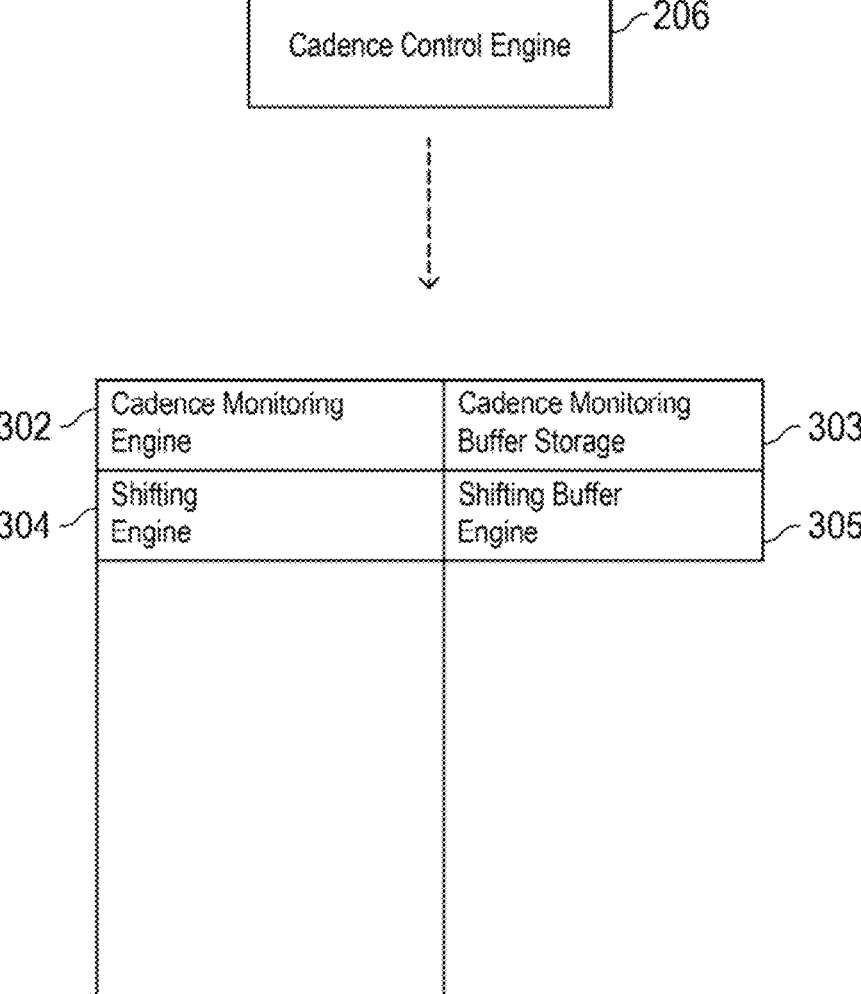
FIG. 3 is a block diagram of a cadence control engine within the AHI, which monitors a cadence of pedaling to provide feedback regarding adjustments in transmission speed ratio, in accordance with some embodiments of the present invention.

FIG. 3 illustrates an implementation of the cadence control engine 206. The cadence control engine 206 may include hardware, software and/or firmware configured to monitor a cadence of pedaling using one or more speed sensors (e.g., two sensors) within a system that may include CVP hub 251. The measured speed of pedaling (cadence measured) is a feedback signal that is compared to a pre-set target cadence value. A cadence error is derived. The derived cadence error (cadence target-cadence measured) is reduced to a small value by applying corrections or modifications to a position of the shift driver 232. In particular, the cadence control engine 206 includes a cadence monitoring engine 302 and a shifting engine 304, both of which may include hardware, software and/or firmware configured to perform the functions of the cadence control engine 206. The cadence monitoring engine 302 may determine whether a cadence exists or is trackable, and if so, track the cadence and compare the cadence with a desired cadence as a prescribed setpoint, based on a closed loop control. The cadence monitoring engine 302 may continuously or at discrete times transmit the tracked cadence error to the shifting engine 304. The shifting engine 304 may be configured to adjust a transmission shift ratio based on the comparison between the cadence and the desired cadence. For example, if the monitored cadence is above the desired cadence, then the shifting engine 304 may upshift, or increase the transmission shift ratio. If the monitored cadence is below the desired cadence, then the shifting engine 304 may downshift, or decrease the transmission shift ratio.

A cadence monitoring buffer storage 303 may include hardware, software and/or firmware configured to store information and/or metadata obtained by the cadence monitoring engine 302. For example, the information may include information or logs of pedaling speed and corresponding timestamps, and/or comparisons between the pedaling speed and the desired speed. The metadata may include information such as trends and/or other results of analysis of the tracked pedaling speed. Meanwhile, a shifting buffer storage 305 may include hardware, software and/or firmware configured to store information and/or metadata obtained by the shifting engine 304. For example, the information may include information or logs of any adjustments that were made to transmission shift ratios and/or times at which such transmission shift ratios occurred. The information may also include other parameters or characteristics of the vehicle to which the adjustments to the transmission shift ratios were made.

Figure 4:
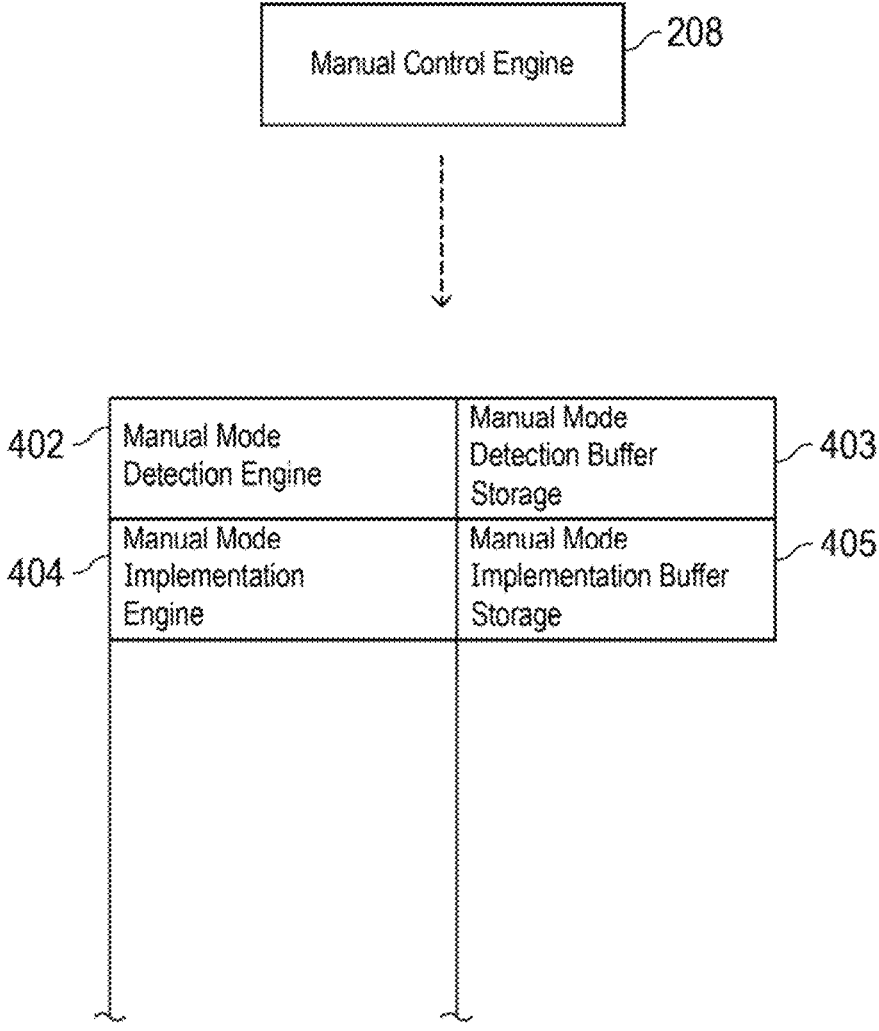
FIG. 4 is a block diagram of a manual control engine within the AHI, which implements manual control during a manual mode, in accordance with some embodiments of the present invention.

FIG. 4 illustrates an implementation of the manual control engine 208. The manual control engine 208 may include hardware, software and/or firmware configured to detect whether a CVP system is in manual mode, as opposed to automatic mode, and implement manual mode processes upon detection of manual mode. In particular, the manual control engine 208 may include a manual mode detection engine 402 and a manual mode implementation engine 404, both of which may include hardware, software and/or firmware configured to perform the functions of the manual control engine 208. The manual mode detection engine 402 may determine when the CVP system is operating in a manual mode. For example, determining that the CVP system is operating in a manual mode may include receiving an instruction to move to a particular gear or gear ratio. Upon detecting that the CVP system is to be operated in a manual mode, the manual mode detection engine 402 may transmit such an indication to the manual mode implementation engine 404. The manual mode implementation engine 404 may perform an implementation of the manual mode, which includes adjustments between a discrete number of rotational positions of a shift driver (e.g., step-wise positions), which are indicative of specific (e.g., step-wise) transmission speed ratios.

A manual mode detection buffer storage 403 may include hardware, software and/or firmware configured to store information and/or metadata obtained by the manual mode detection engine 402. For example, the information may include information or logs of any instances and timestamps corresponding to the instances at which a manual mode was detected. The metadata may include information such as frequencies or trends relating to a number or pattern of instances at which the manual mode was detected. Meanwhile, a manual mode implementation buffer storage 405 may include hardware, software and/or firmware configured to store information and/or metadata obtained by the manual mode implementation engine 404. For example, the information may include information or logs of particular instructions that were transmitted to and/or carried out by the manual mode implementation engine 404, such as particular rotational positions of a shift driver and/or corresponding transmission speed ratios. The information may further include frequencies corresponding to particular rotational positions of a shift driver and/or other trends or patterns relating to the information or logs of particular instructions.

Figure 5:
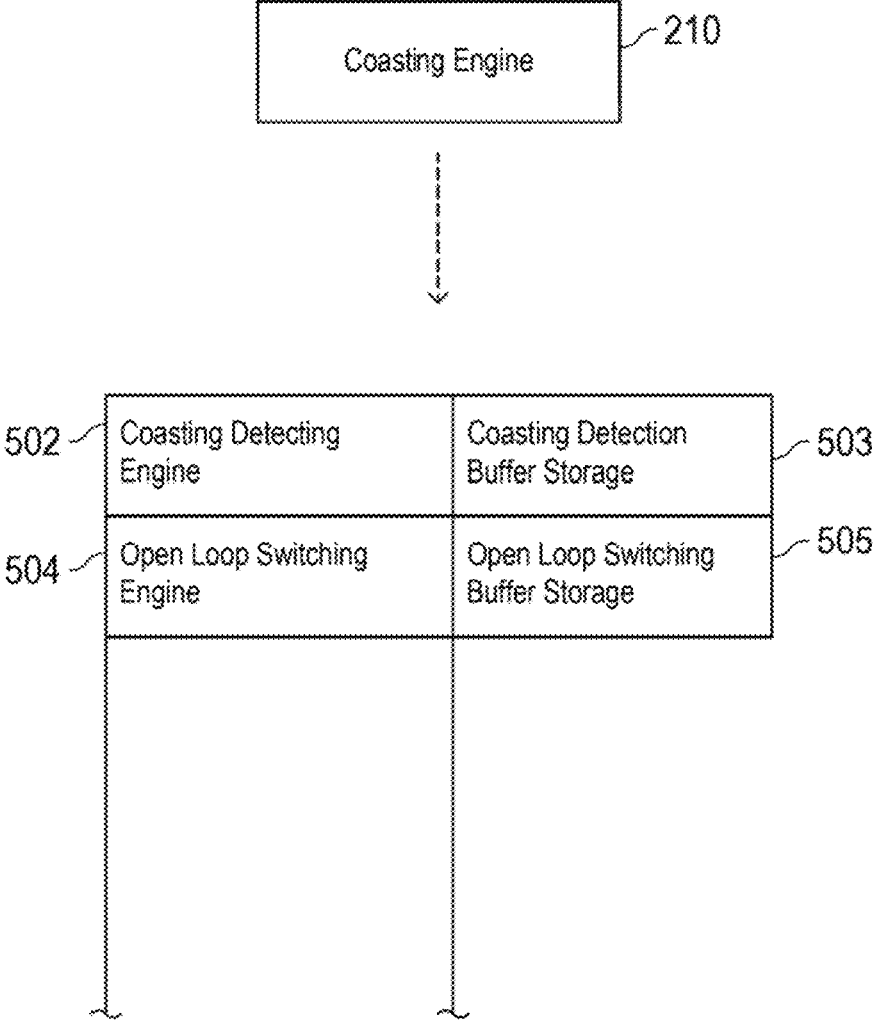
FIG. 5 is a block diagram of a coasting engine within the AHI, which implements an open loop switching control upon detecting coasting, in accordance with some embodiments of the present invention.

FIG. 5 illustrates an implementation of the coasting engine 210. The coasting engine 210 may include hardware, software and/or firmware configured to detect whether a vehicle is in a coasting mode, and upon detecting such, implement an open loop mode. In particular, the coasting engine 210 may include a coasting detecting engine 502 and an open loop switching engine 504, both of which may include hardware, software and/or firmware configured to perform the functions of the manual control engine 208. The coasting detecting engine 502 may determine when the vehicle is coasting, such as when no cadence is being measured when a human stops pedaling, and/or no signal (or signal indicative of zero rotation) is received from one or more speed sensors that measure a speed of pedaling. Meanwhile, the coasting detecting engine 502 may transmit an indication that the vehicle is coasting to the open loop switching engine 504. Once the open loop switching engine 504 receives the indication that the vehicle is coasting, the open loop switching engine 504 switches operation to an open loop mode (e.g., from a closed loop mode). The open loop mode relies on a pre-defined and "calibrated" relationship between the shift driver position and speed ratio as well as the implied desired speed ratio to follow during the costing interval. Desired speed ratio during coasting can be implied form cadence engine cadence setpoint and actual vehicle speed (output speed).

A coasting detection buffer storage 503 may include hardware, software and/or firmware configured to store information and/or metadata obtained by the coasting detecting engine 502. For example, the information may include information or logs of any instances and timestamps corresponding to the instances at which a coasting condition was detected. The metadata may include information such as frequencies or trends relating to a number or pattern of instances at which the coasting mode was detected. Meanwhile, an open loop switching buffer storage 505 may include hardware, software and/or firmware configured to store information and/or metadata obtained by the open loop switching engine 504. For example, the information may include information or logs of particular instructions that were transmitted to and/or carried out by the open loop switching engine 504, and particular instances and/or time-stamps of switching to and from the open loop mode. The information may further include frequencies indicating how often the open loop mode has been occurring historically.

Figure 6:
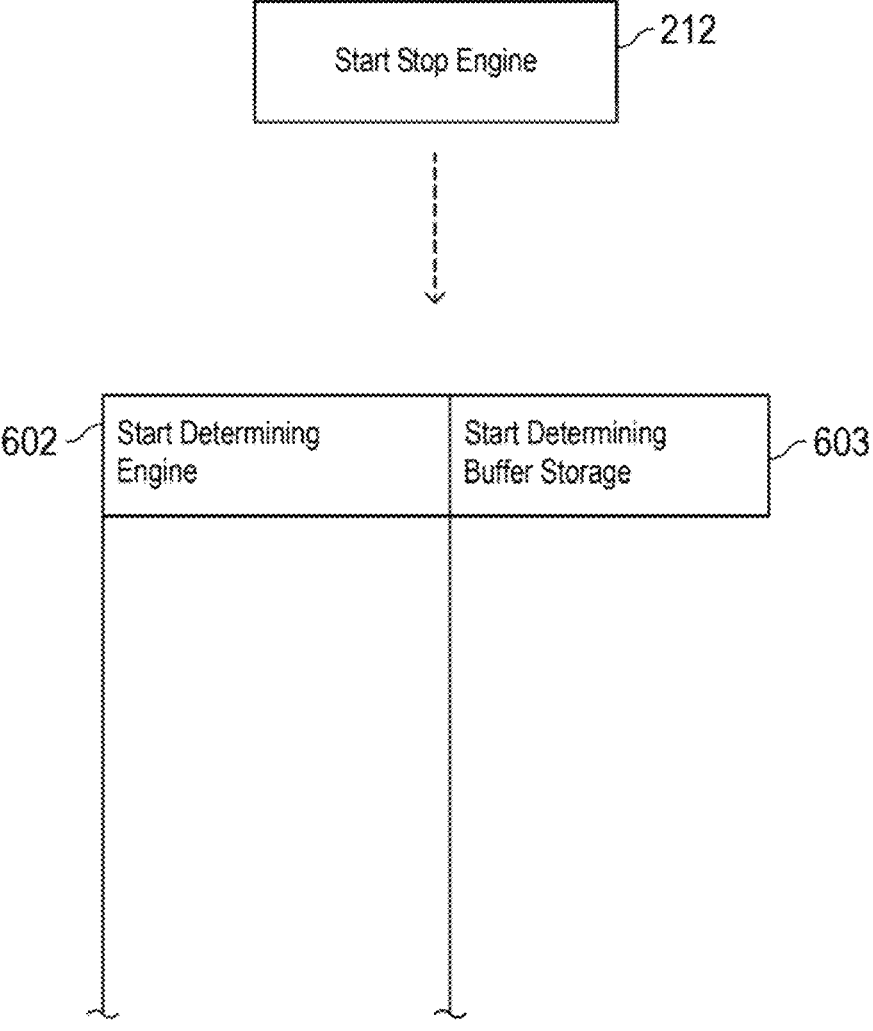
FIG. 6 is a block diagram of a start stop engine within the AHI.

FIG. 6 illustrates an implementation of the start stop engine 212. The start stop engine 212 may include hardware, software and/or firmware configured to detect whether a vehicle is transitioning from a rolling (moving) state to a stopped state (not moving) and preparing for a return to a rolling state. The start stop engine 212 coordinates with the shifting engine in an open loop mode to adjust or position the shift mechanism (shift driver) so that at the earliest moments of the bicycle starting up again (resume pedaling and rolling), the CVP is at the pre-set "Start Up After Stop" speed ratio. In particular, the start stop engine 212 may include a start stop determining engine 602, which may include hardware, software and/or firmware configured to perform the functions of the start stop engine 212. The start stop determining engine 602 may determine that a vehicle is transitioning from a rolling (moving) state to a stopped state (not moving).

A start stop determining buffer storage 603 may include hardware, software and/or firmware configured to store information and/or metadata obtained by the start determining engine 602. For example, the information may include information or logs of any instances and timestamps in which the vehicle was determined to have transitioned from a rolling state to a stopped state.

Figure 7:
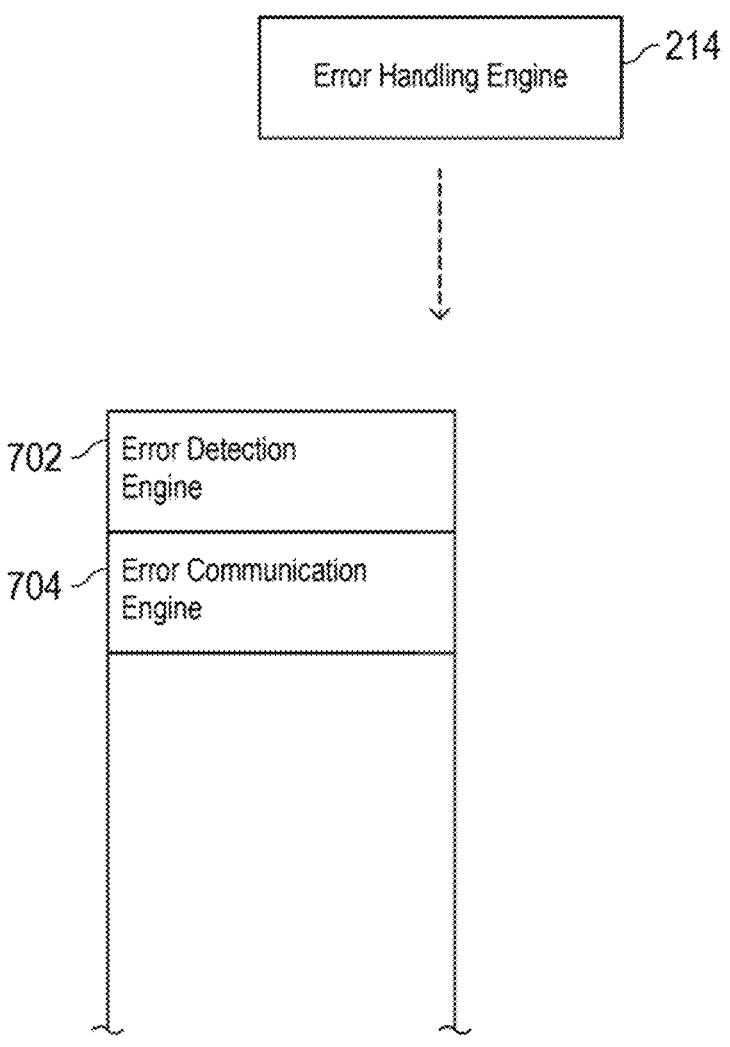
FIG. 7 is a block diagram of an error handling engine within the AHI, which monitors for errors, in accordance with some embodiments of the present invention.

FIG. 7 illustrates an implementation of the error handling engine 214. The error handling engine 214 may include hardware, software and/or firmware configured to communicate any system errors, relating to conditions (states), events, and parameters, to the CAN Bus or WiFi ports. The errors may include end stop approach events, excessive actuator stall events, or insufficient speed ratio due to actuator stall (short shift event) or perhaps a failed calibration sequence. In particular, the error detection engine 702 may detect such errors while the error communication engine 704 may communicate such errors to the CAN Bus and/or the WiFi ports.

Figure 8:
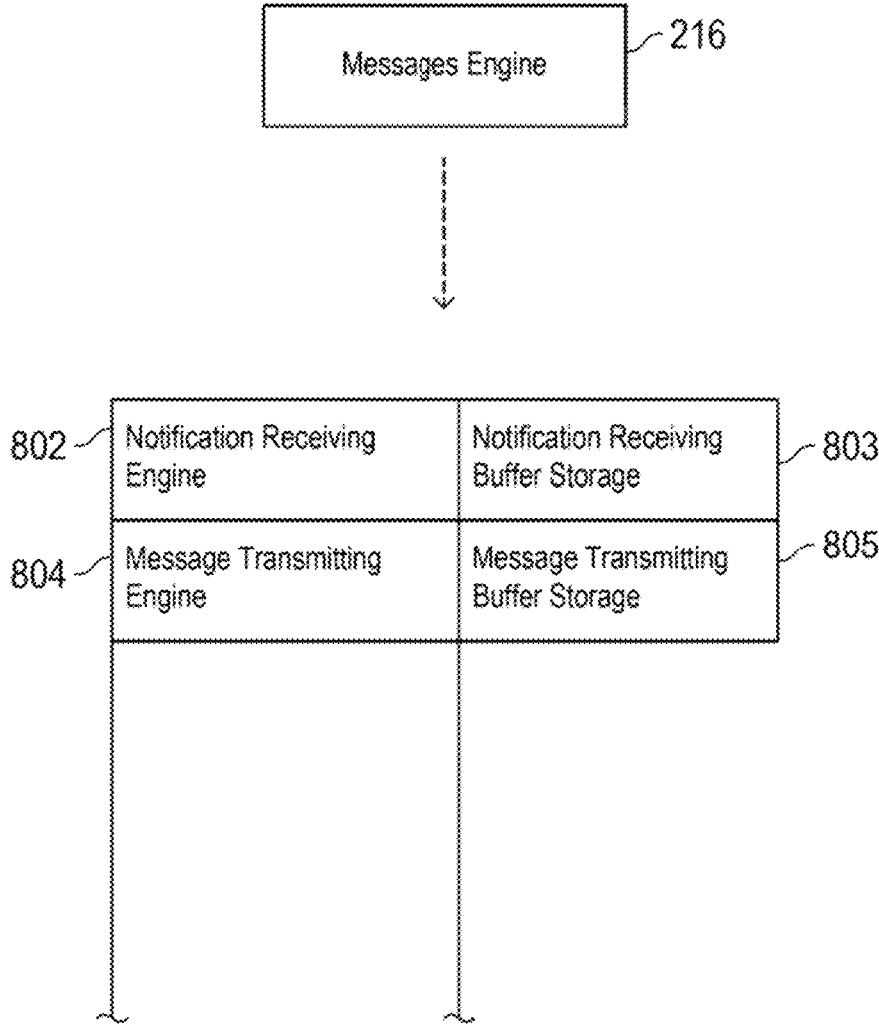
FIG. 8 is a block diagram of a messages engine within the AHI, which monitors for and transmits notifications, for example, to a user device, in accordance with some embodiments of the present invention.

FIG. 8 illustrates an implementation of a messages engine 216. The messages engine 216 may include hardware, software and/or firmware configured to receive any notifications from other engines (e.g., the cadence control engine 206, the manual control engine 208, the coasting engine 210, the start stop engine 212, the error handling engine 214, or the calibration engine 218) and transmit such notifications to one or more user devices (e.g., the smart device 256). In particular, the messages engine 216 may include a notification receiving engine 802 and a message transmitting engine 804, both of which may include hardware, software and/or firmware configured to perform the functions of the messages engine 216. The notification receiving engine 802 may receive notifications regarding an update in status, such as an error being detected, a coasting mode being detected, a change in a shift driver position, the vehicle being started, or the vehicle being calibrated. The notification receiving engine 802 may transmit any notifications, or alternatively, notifications falling under a particular category or classification, or that satisfy a particular criteria such as importance, to the message transmitting engine 804. Once the message transmitting engine 804 receives the notifications, the message transmitting engine 804 may, either selectively or indiscriminately, transmit the notifications to either a user device (e.g., the smart device 256) and/or to one or more other engines (e.g., the cadence control engine 206, the manual control engine 208, the coasting engine 210, the start stop engine 212, the error handling engine 214, or the calibration engine 218). The transmission of the messages may occur in batches, at predetermined time instances, and/or in response to certain triggers.

A notification receiving buffer storage 803 may include hardware, software and/or firmware configured to store information and/or metadata obtained by the notification receiving engine 802. For example, the information may include information or logs of any notifications received, and any other characteristics of the notifications such as importance, categories or classifications of the notifications. Meanwhile, a message transmitting buffer storage 805 may include hardware, software and/or firmware configured to store information and/or metadata obtained by the message transmitting engine 804. For example, the information may include times at which one or more notifications were transmitted, whether or not attempts at transmission were successful, and/or whether or not, and timestamps corresponding to, reattempts at transmission.

Figure 9:
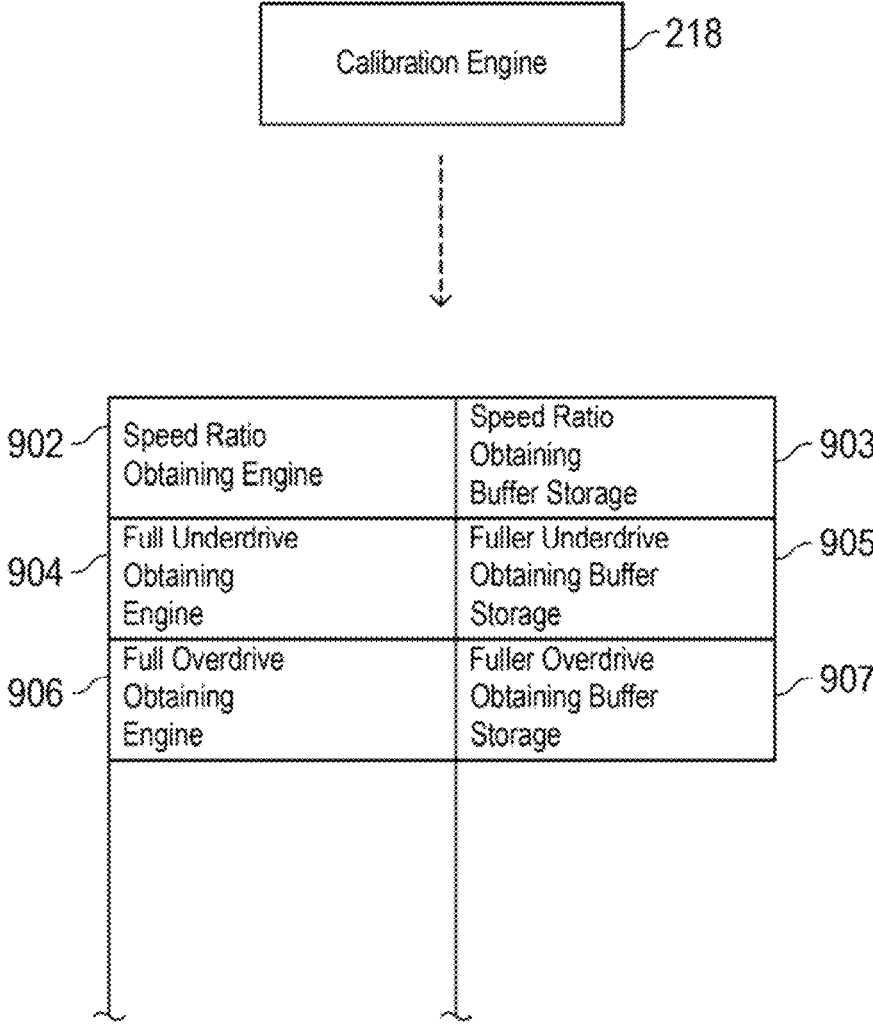
FIG. 9 is a block diagram of a calibration engine within the AHI, which performs calibration of the CVP, in accordance with some embodiments of the present invention.

FIG. 9 illustrates an implementation of a calibration engine 218. The calibration engine 218 may include hardware, software and/or firmware configured to perform one-point calibration, or passive calibration, obtain a relationship between a shift driver position and a transmission speed ratio, and obtain full underdrive (FUD) and full overdrive (FOD) positions corresponding to the shift driver. Passive calibration encompasses active end stop detection and correction, active speed ratio relative to shift driver position error detection and correction.

In particular, the calibration engine 218 may include a speed ratio obtaining engine 902, a FUD obtaining engine 904, and a FOD obtaining engine 906, all of which may include hardware, software and/or firmware configured to perform the functions of the calibration engine 218. The speed ratio obtaining engine 902 may determine or record a shift driver position corresponding to a transmission speed ratio of approximately 0.8, or within a range of approximately 0.7 to 0.9, 0.6 to 1, 0.55 to 1.05, or other transmission speed ratio that is not within the backlash region but not excessively high to require strenuous or uncomfortable pedaling. The speed ratio obtaining engine 902 may downshift until detecting a stalling event, which indicates a mechanical end stop in the shift mechanism, and upshift by approximately 30 degrees to compensate for expected mechanism backlash, according to the converted range following the aforementioned 4-bar mechanism conversion. When upshifting, in some examples, the speed ratio obtaining engine may refrain from recording a FOD position. The speed ratio obtaining engine 902 may increase the transmission speed ratio incrementally, as quickly as possible. The transmission speed ratio may be detected via speed sensors. The speed ratio obtaining engine 902 may reduce an intensity, or rate of change of the shift driver position over time, to avoid the shift driver becoming stuck, or otherwise overload, crack, or deform the shift mechanism or AHI.

The speed ratio obtaining engine 902 may then detect that a pedaling speed is at least a threshold speed, or that an amount of hub rotational motion is at least a threshold amount of motion. The threshold amount of hub rotational motion may be, for example, one pedal stroke, or any applicable number or range of pedal strokes. Upon such a detection, the speed ratio obtaining engine 902 may adjust a transmission speed ratio until the speed ratio obtaining engine 902 detects that the transmission speed ratio is approximately 0.8, or any other value within the aforementioned range. In some examples, the speed ratio obtaining engine 902 may estimate a position at which such a transmission speed ratio or range of speed ratios occurs based on a lookup table. Within several pedal strokes, such as between three to five pedal strokes, the speed ratio obtaining engine 902 may be able to determine such a position. The speed ratio obtaining engine 902 may verify an actual transmission speed ratio and record a corresponding shift driver position. The speed ratio obtaining engine 902 may convert the shift driver position to a value by using a formula, look up table or a relationship that the shift driver position equals, or is approximately equal to, 100 times the transmission speed ratio, minus 50. Thus, a shift driver FUD position is about 30 degrees away according to the converted range following the aforementioned 4-bar mechanism conversion from a position of the shift driver that corresponds to a transmission speed ratio of 0.8, in some embodiments. In some examples, the speed ratio obtaining engine 902 may leverage this transmission speed ratio and shift driver position relationship pair, as well as a table or known or historical relationship (hereinafter "table") between transmission speed ratio and shift driver position, in order to determine specific shift driver positions that correspond to different transmission speed ratios. The table may additionally contain a relationship between AHI motor position and transmission speed ratio, and/or AHI motor position and shift driver position. The AHI motor position may be a scaled version of the shift driver position. The table may also contain values of backlash at FUD, minimum and maximum theoretical CVP speed ratios, a maximum known FOD position, and a maximum known CVP speed ratio. The table or known relationship may be based on characteristics such as cog ratios, wheel size, and an operating mode such as eco mode or turbo mode. An example illustration of a known relationship is in FIG. 10. In some such a manner, the speed ratio obtaining engine 902 may calibrate the CVP hub without a three-point calibration, thereby resulting in a shorter calibration process and avoiding going to overdrive.

Figure 10:
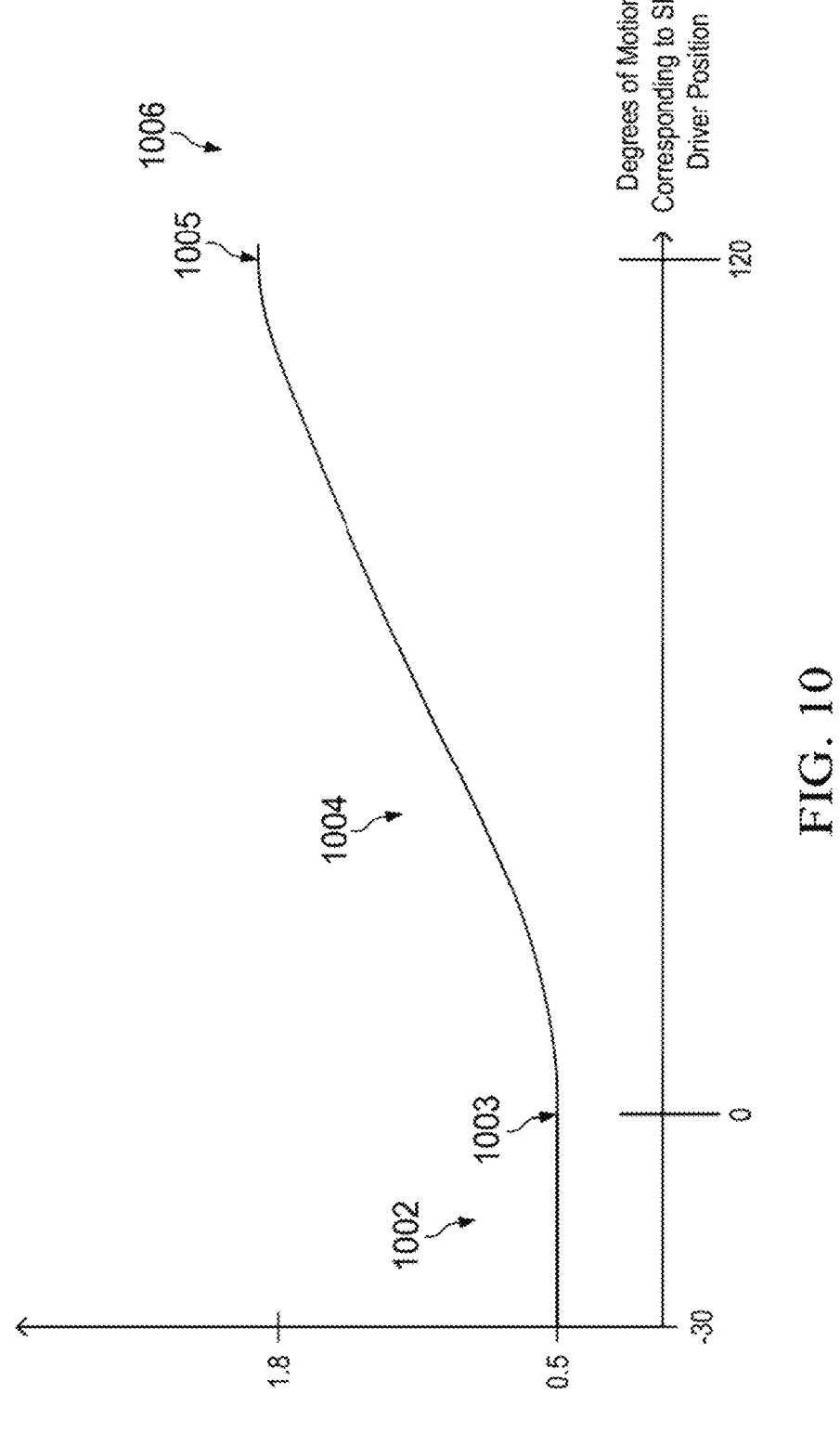
FIG. 10 is a diagram illustrating an example relationship between a shift driver position and transmission speed ratio, in accordance with some embodiments of the present invention.

Moving to FIG. 10, a backlash region 1002 corresponds to a shift driver position between −30 and zero degrees according to the converted range following the aforementioned 4-bar mechanism conversion. A FUD position 1003 is at an onset of backlash. A region 1004 may be approximated as a second order polynomial in which as the shift driver moves, the transmission speed ratio increases. A FOD position 1005 is at an onset of a saturation region 1006, in which transmission speed ratio no longer increases as the shift driver moves.

Figure 11:
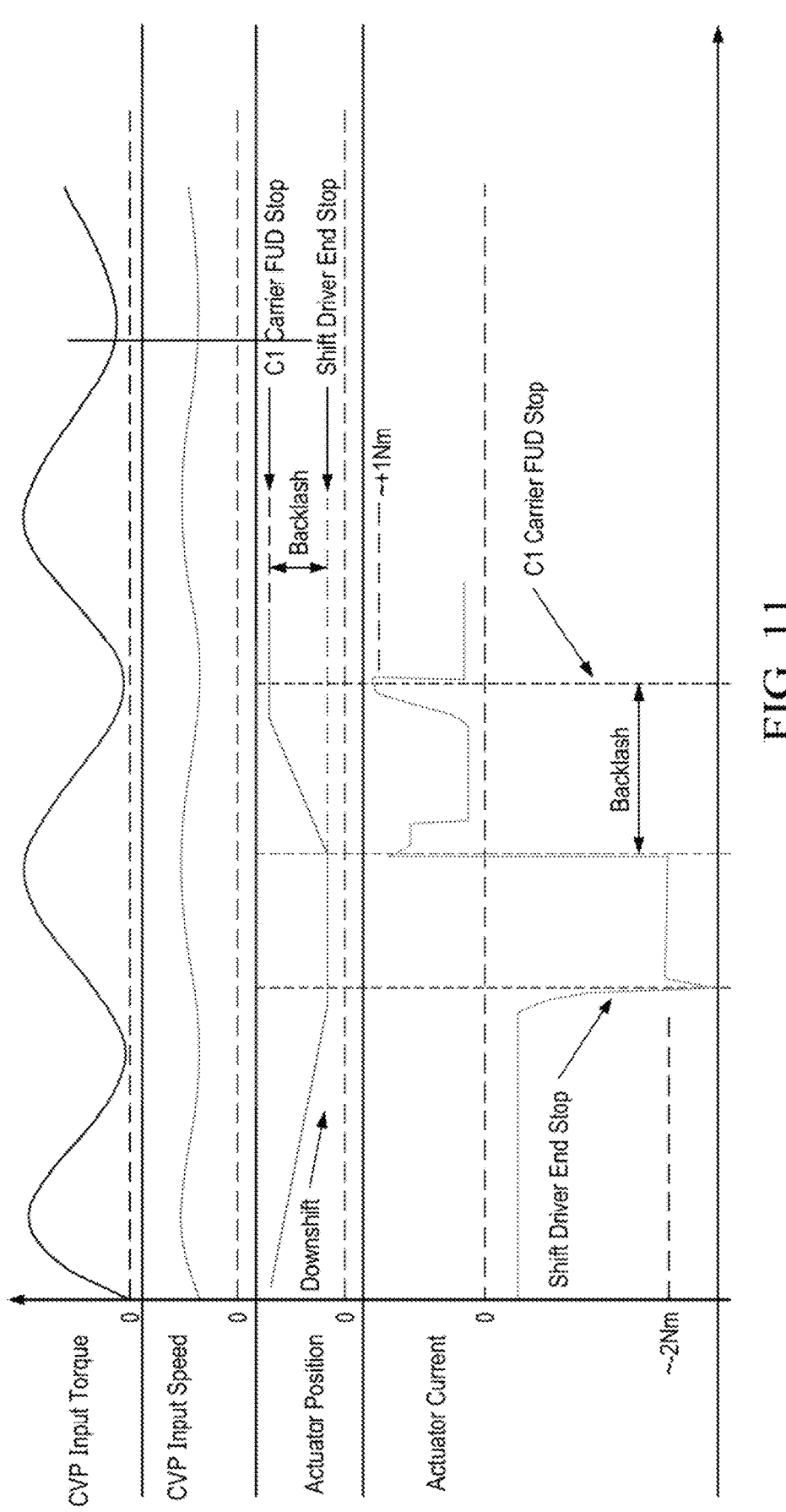
FIG. 11 is a diagram illustrating an example relationship between CVP input torque, CVP input speed, actuator position, and actuator current, in accordance with some embodiments of the present invention.

Going back to FIG. 9, the FUD obtaining engine 904 may obtain or verify a software stop corresponding to a FUD position. The FUD obtaining engine 904 may actively monitor a shift driver position compared to a transmission speed ratio during a user riding the vehicle to determine at which shift driver position backlash commences. For example, when the transmission speed ratio is greater than 0.5, upon the FUD obtaining engine 904 detecting uniform pedaling, for example, at a cadence of at least 30 revolutions per minute, the FUD obtaining engine 904 may rotate the shift driver towards a FUD position. An AHI torque may increase during the process. Upon detecting that an incremental change in a shift driver rotation does not result in an incremental decrease in transmission speed ratio, the FUD obtaining engine 904 may detect an onset of backlash. Also at that point, an incremental change in the shift driver rotation in an opposite direction does result in an incremental increase in transmission speed ratio. The onset of backlash is a point of a lowest speed ratio of the CVP and may be considered as a FUD position for the shift driver. The FUD obtaining engine 904 may record this position as a software stop, which may be sufficiently far from the FUD mechanical end stop, which includes the backlash region. Using the prediction of a backlash, the FUD obtaining engine 904 may avoid entering into a range of shift driver positions in which backlash exists. An example relationship between CVP input torque, CVP input speed, actuator position, and actuator current is illustrated in FIG. 11.

Figure 12:
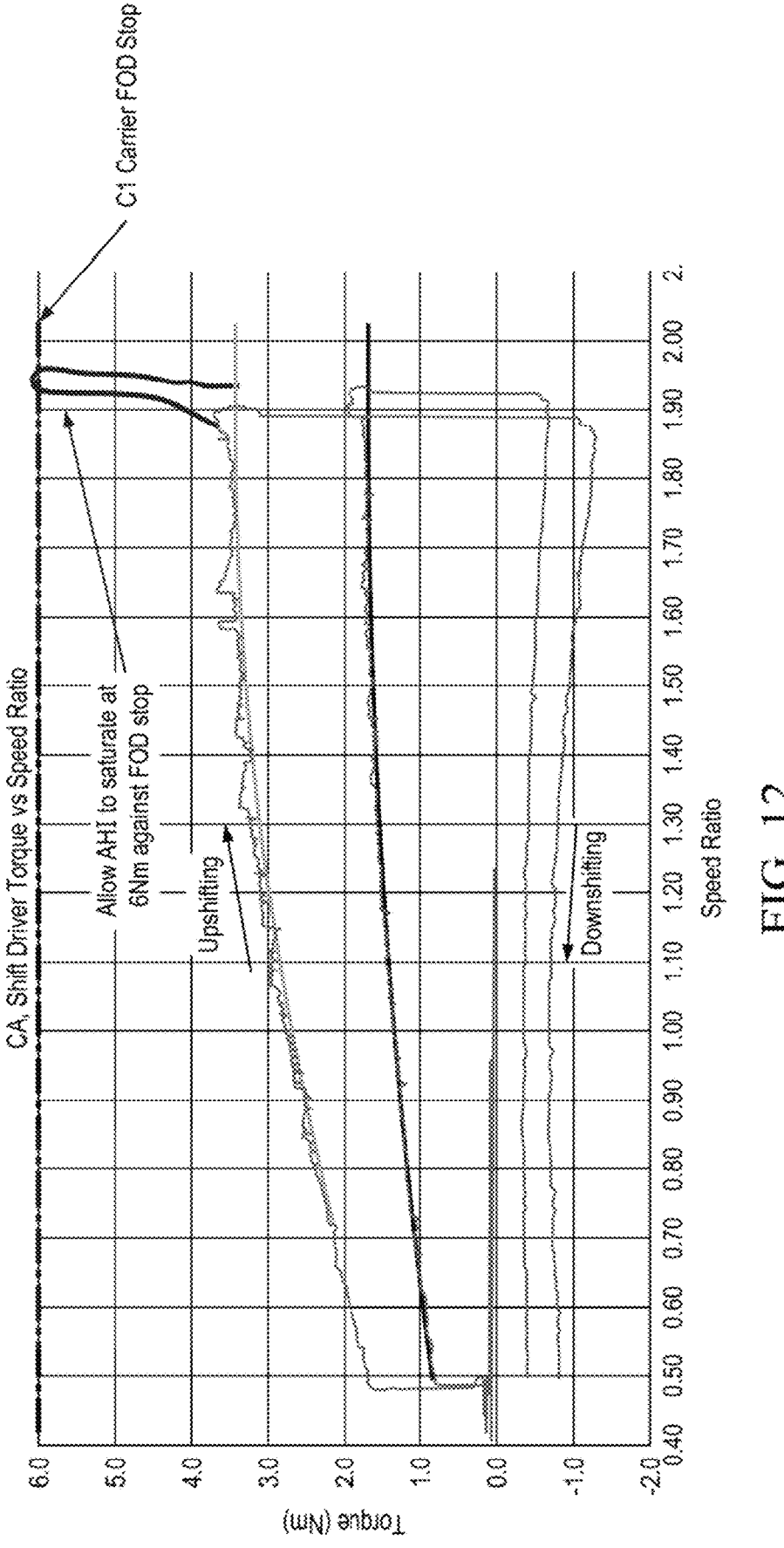
FIG. 12 is a diagram illustrating an example relationship between input torque of the shift driver and a transmission speed ratio, in accordance with some embodiments of the present invention.
Figure 13A:
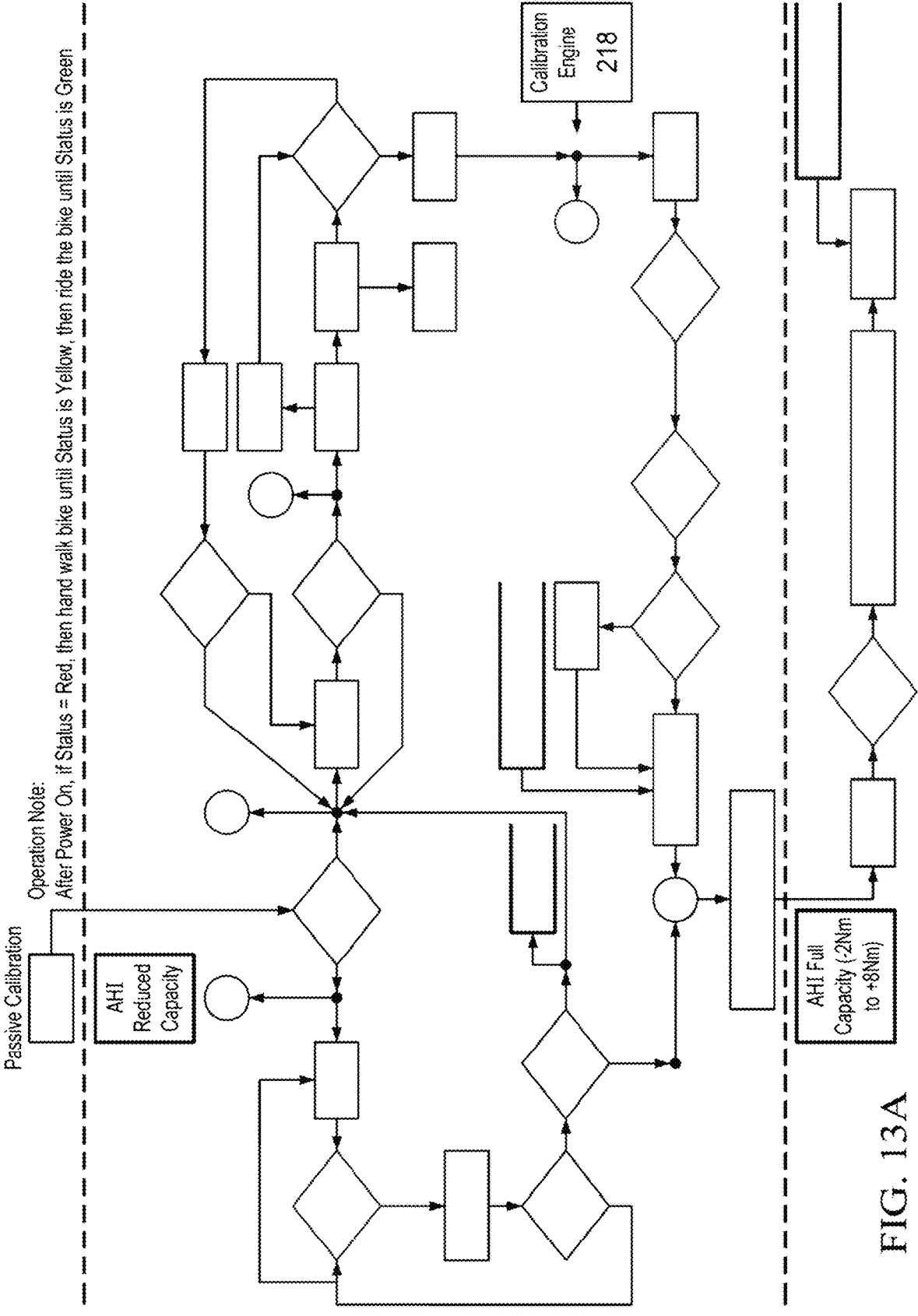
FIGS. 13A-13C, 14A-14C, 15A-15D, and 16A-16C are flowcharts illustrating different modes of passive calibration, depending on whether a calibration record exists, in accordance with some embodiments of the present invention.
Figure 13B:
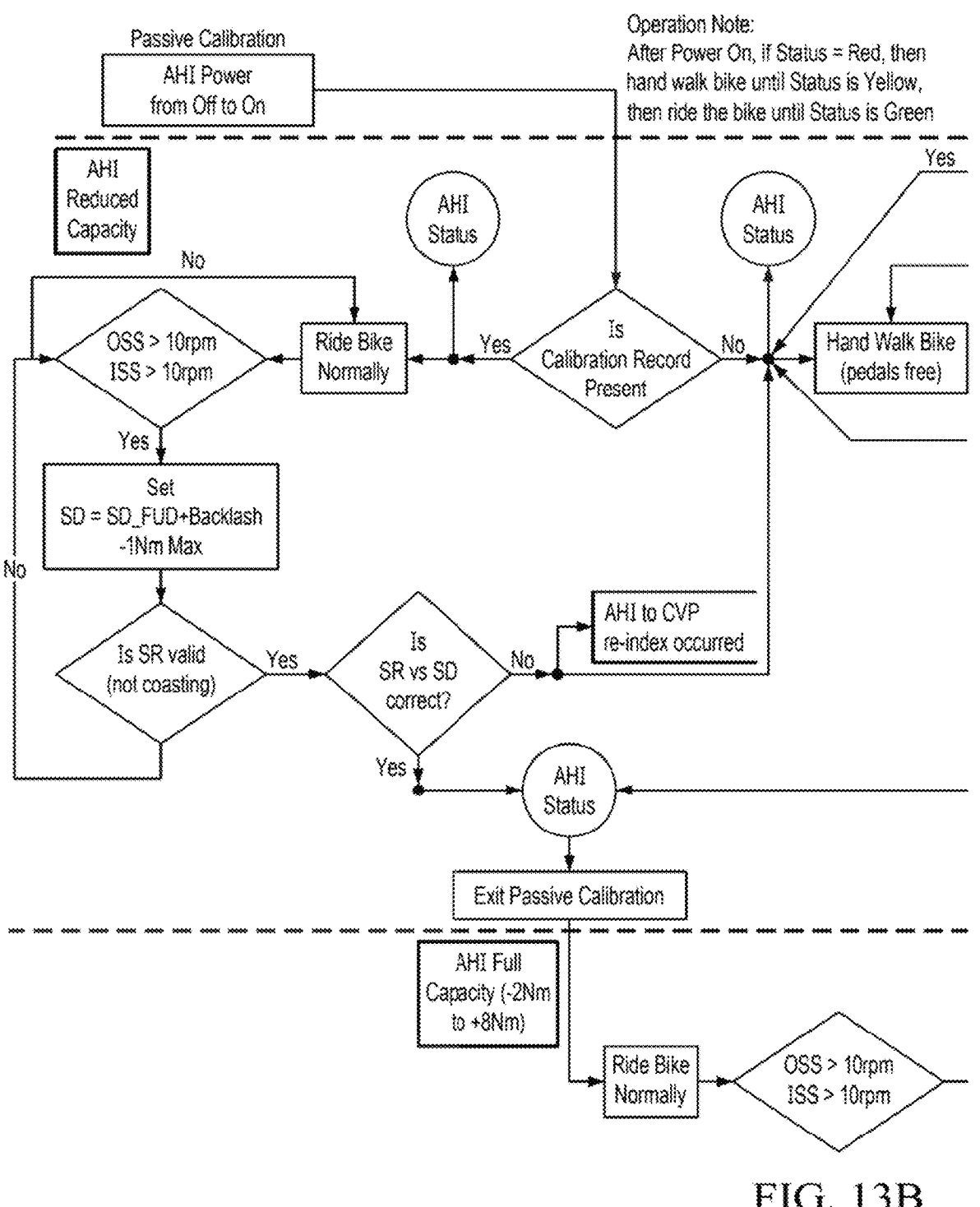
Figure 13C:
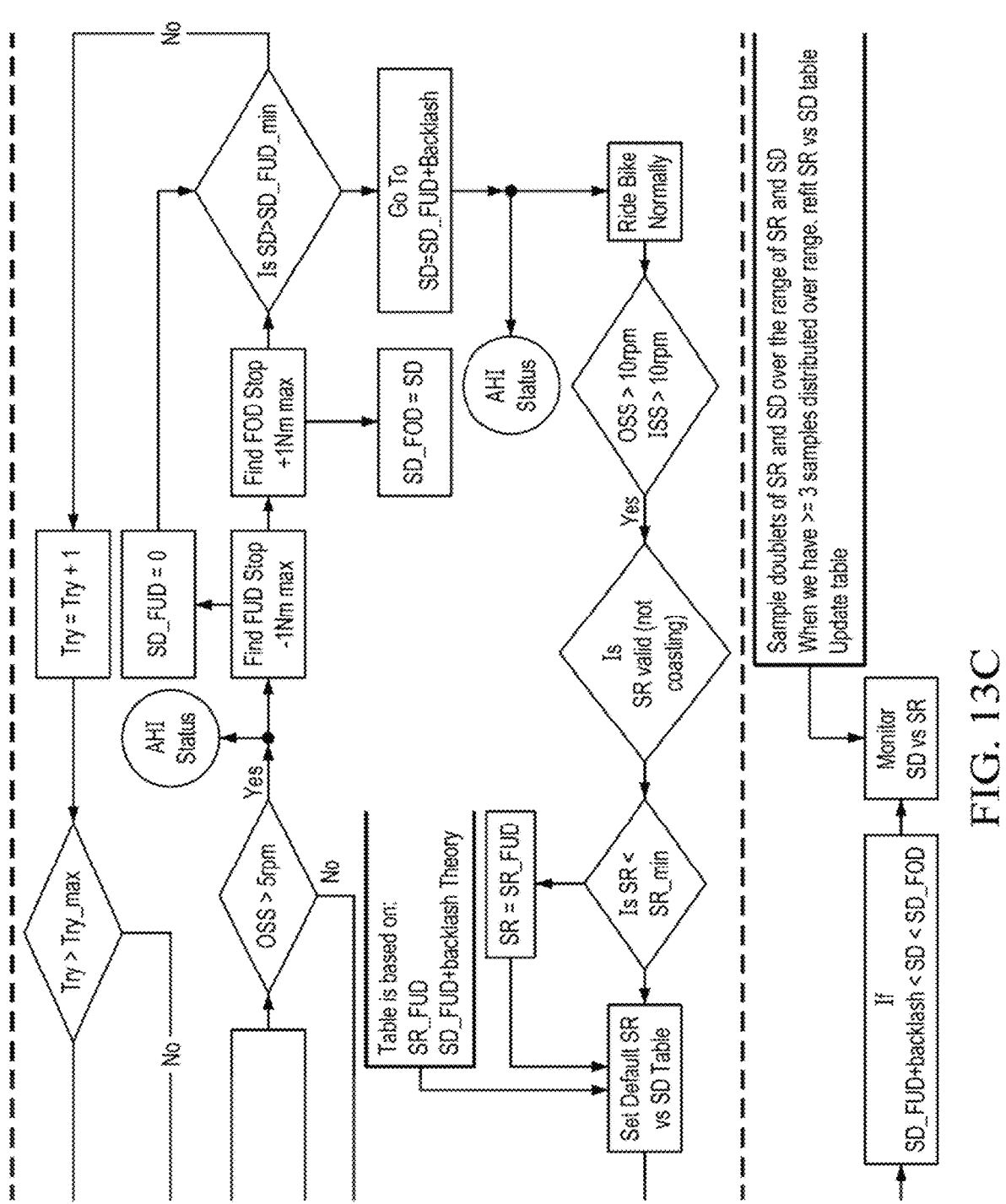
Figure 14A:
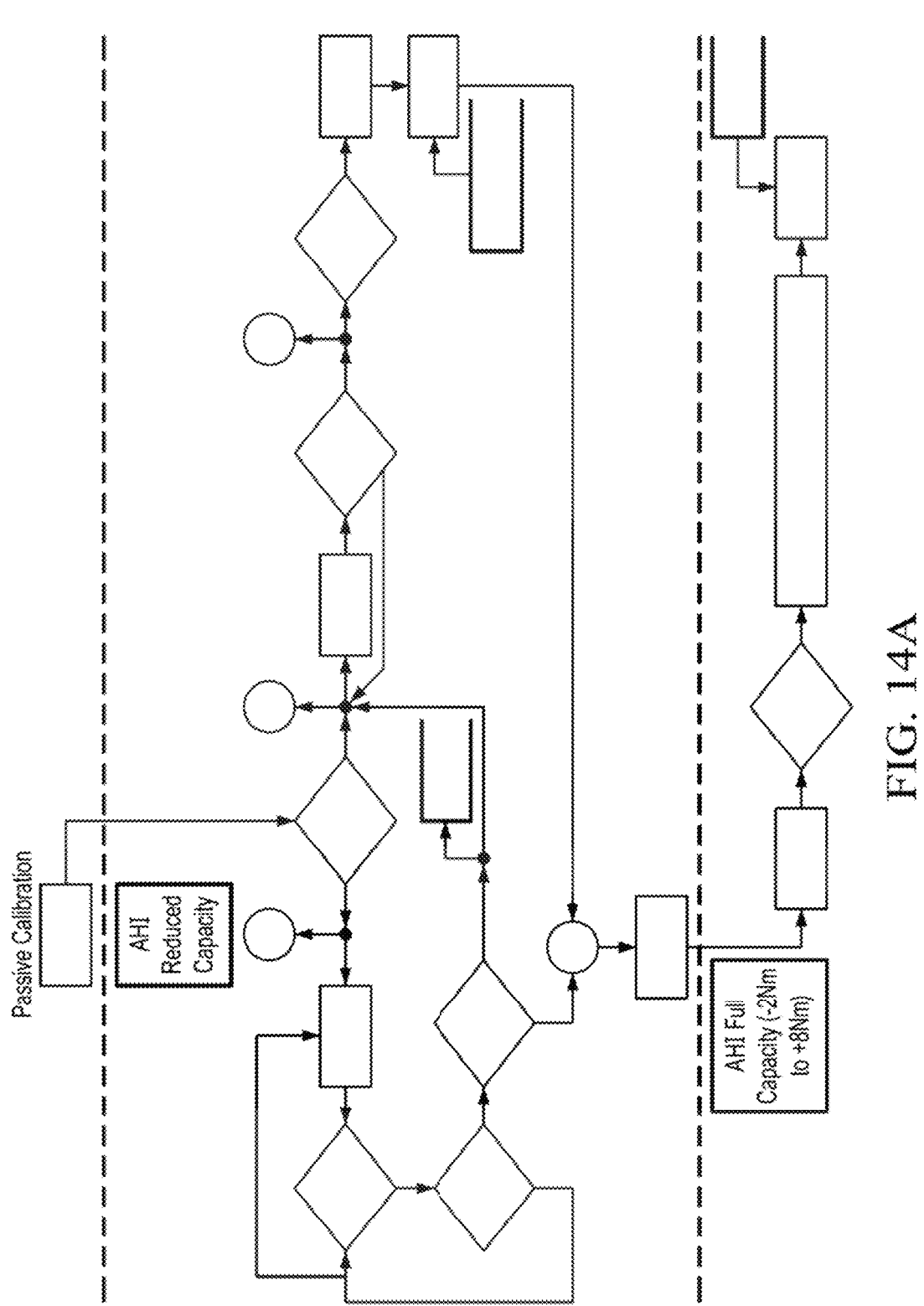
Figure 14B:
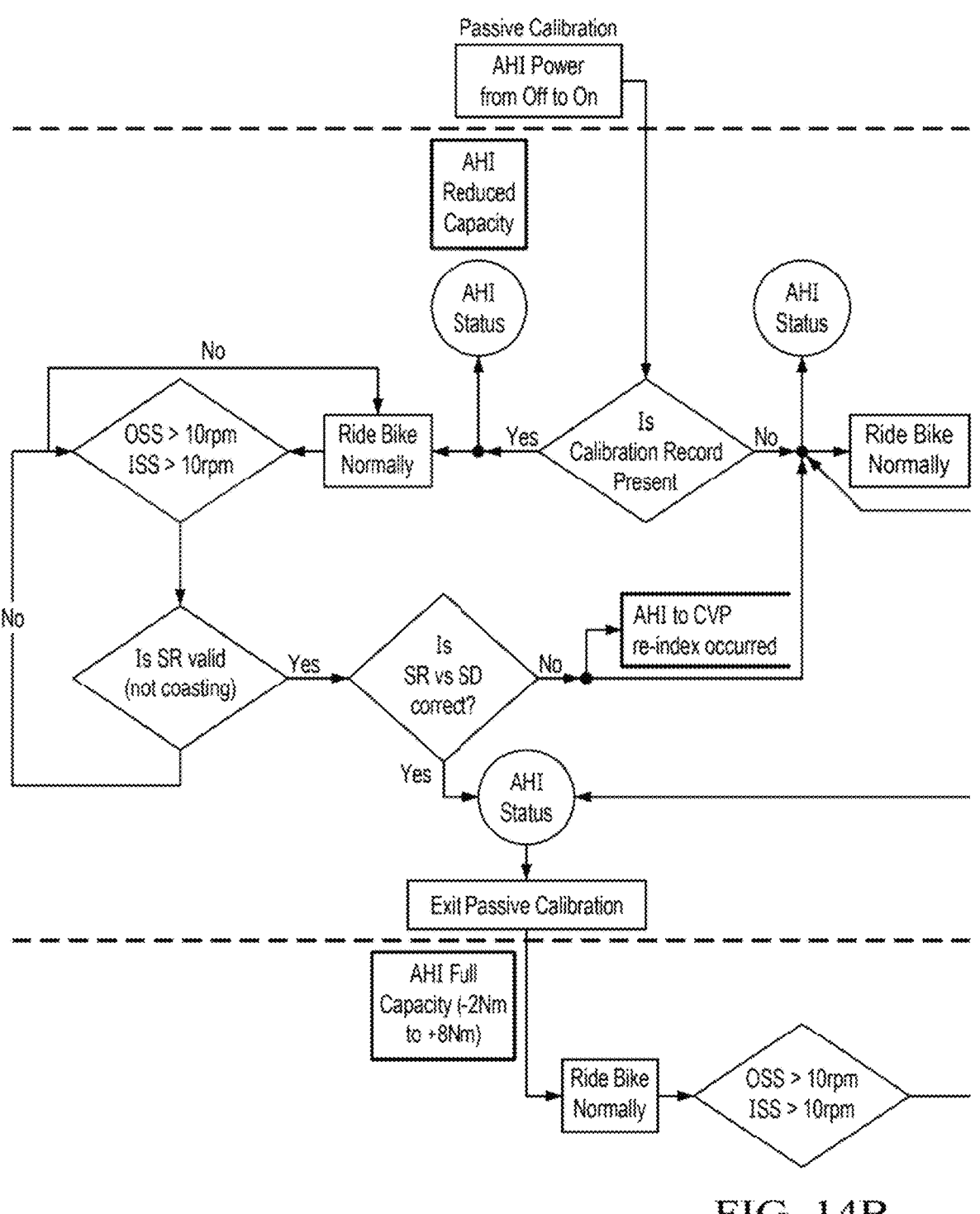
Figure 14C:
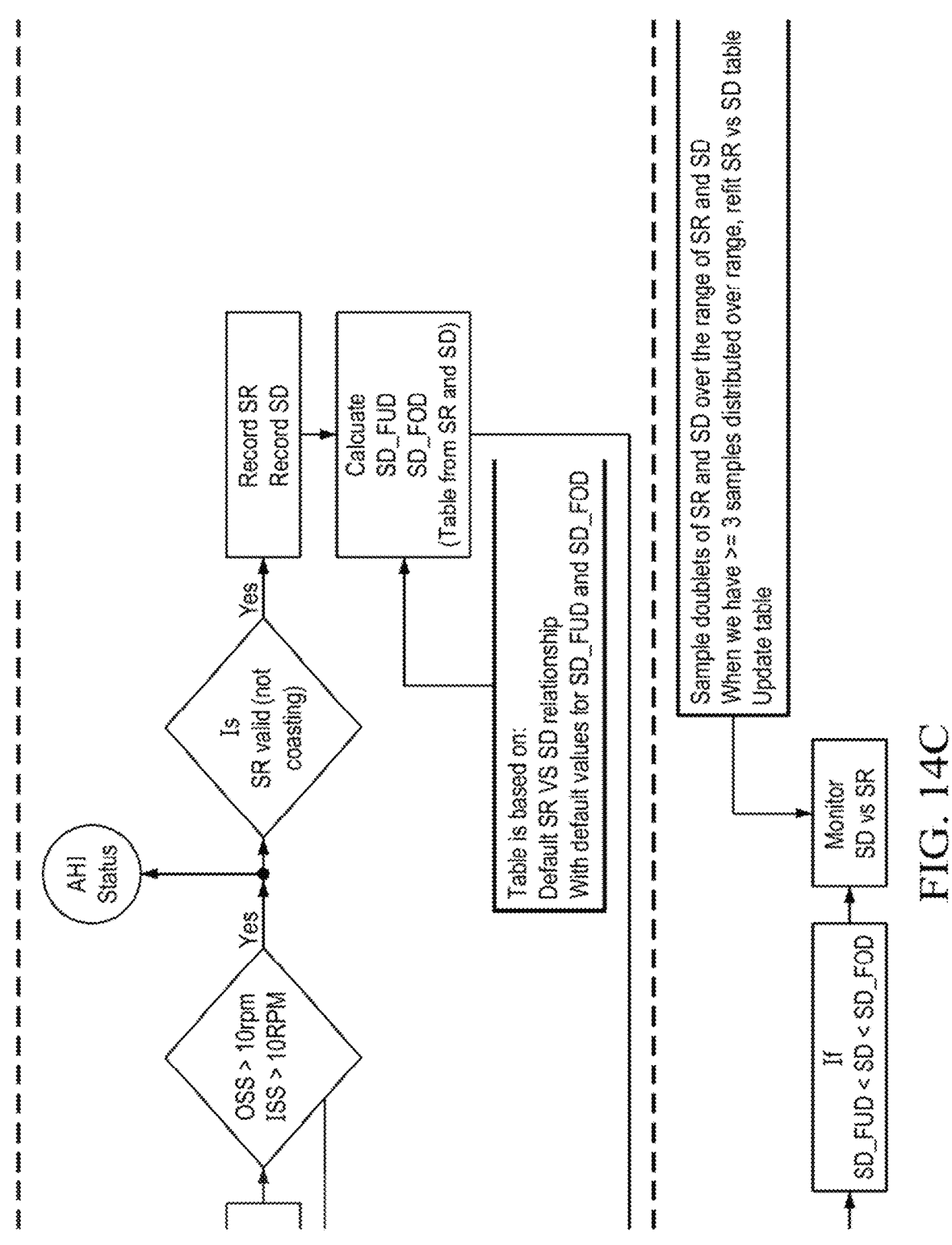
Figure 15A:
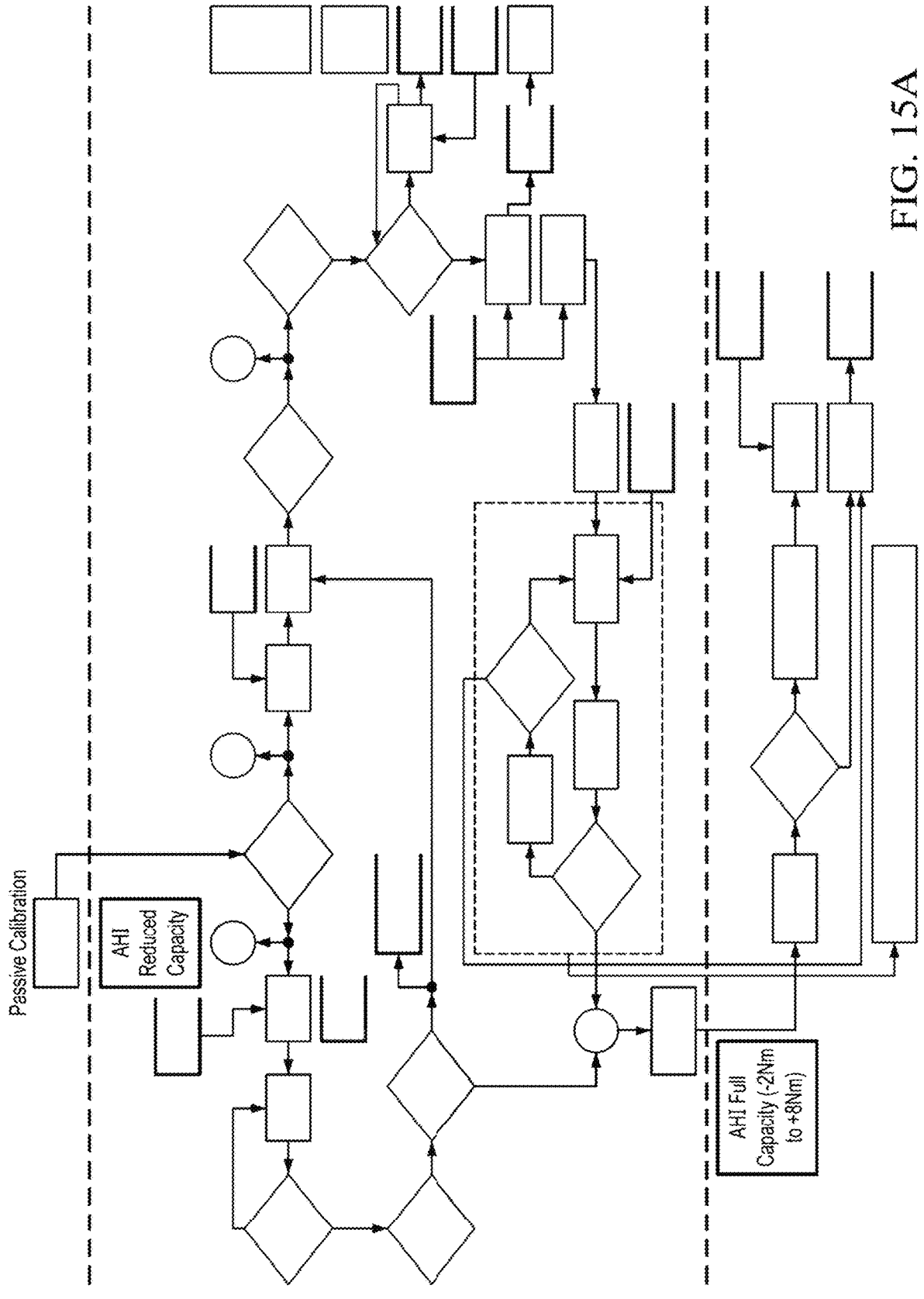
Figure 15B:
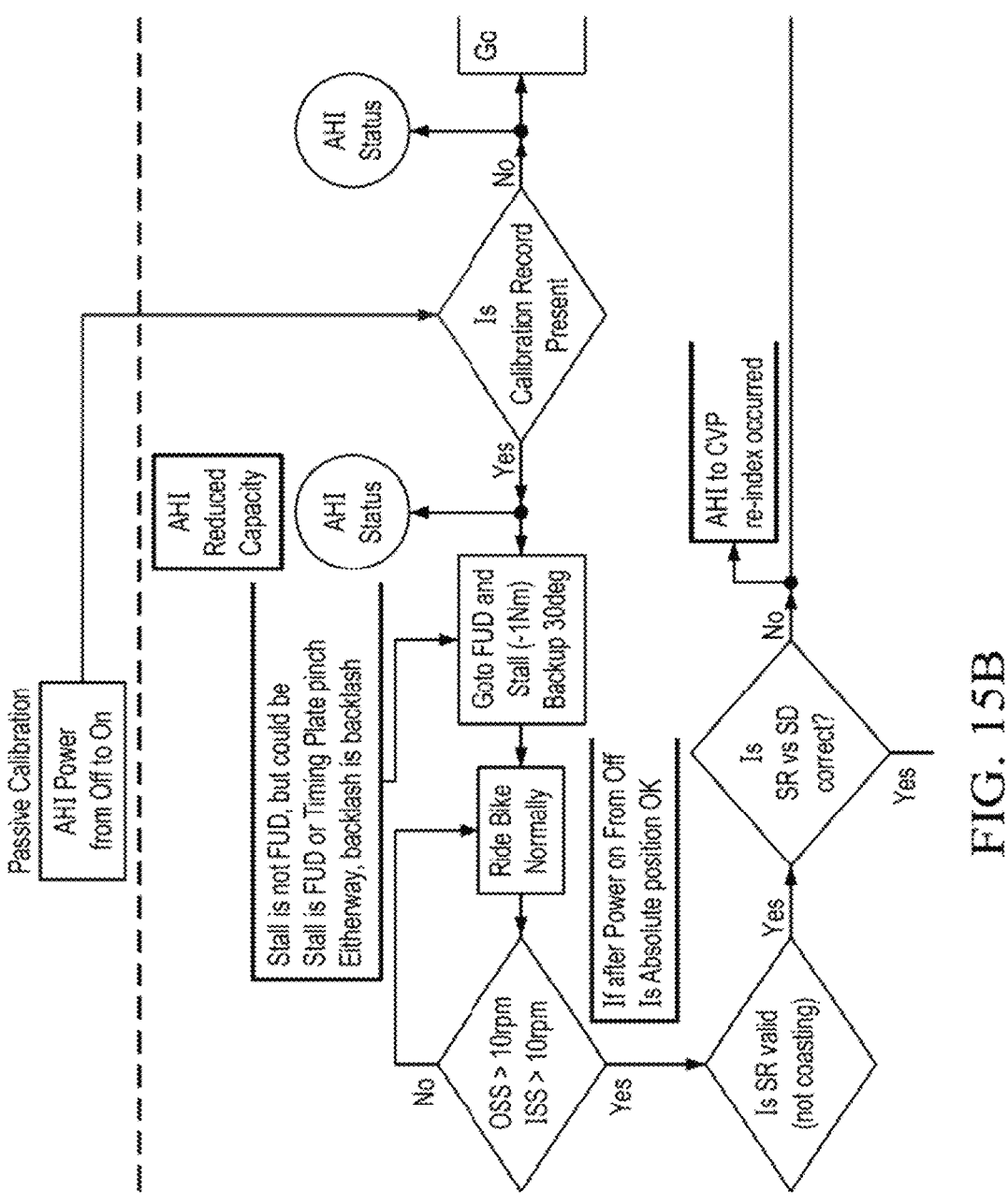
Figure 15B:
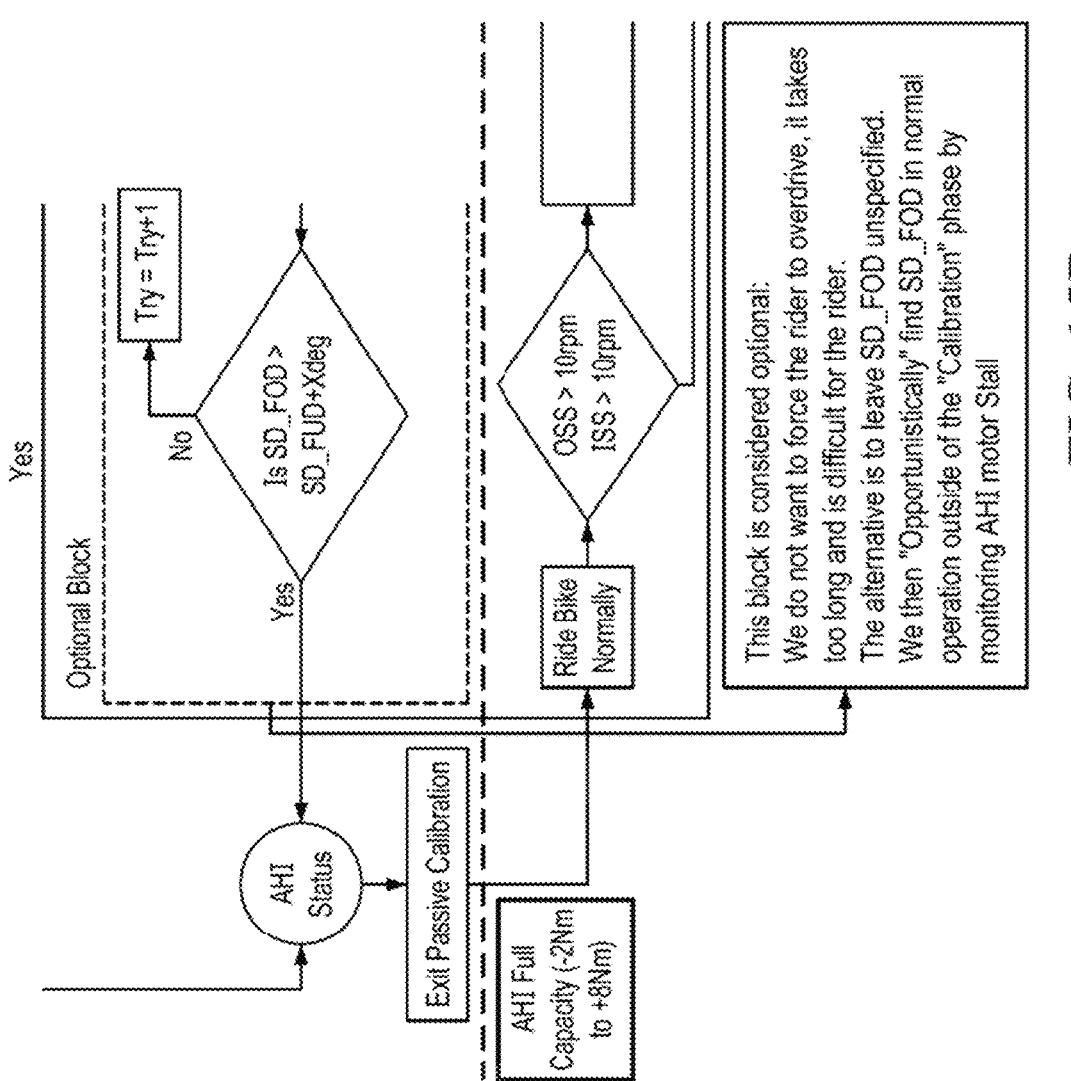
Figure 15C:
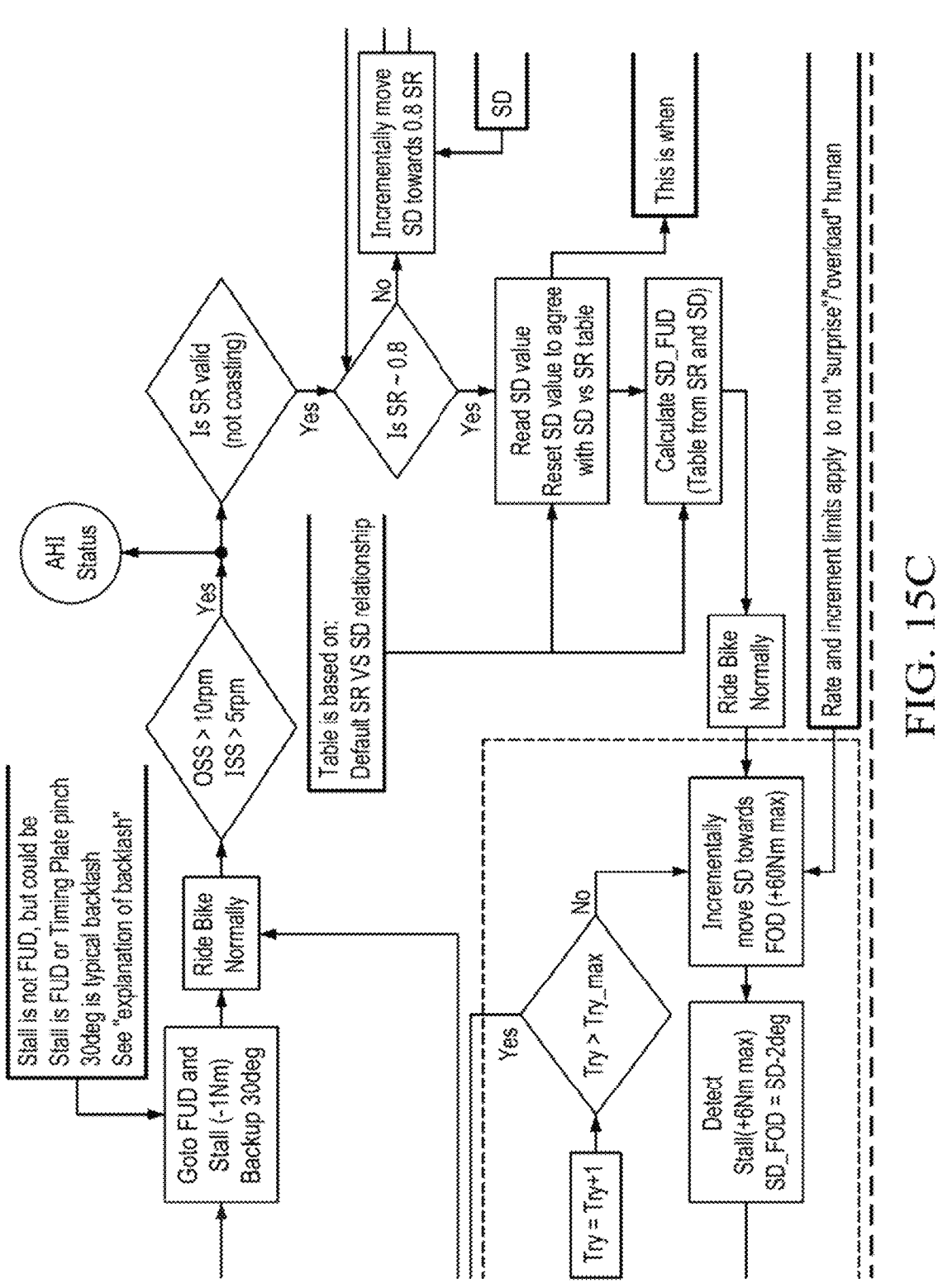
Figure 15C:
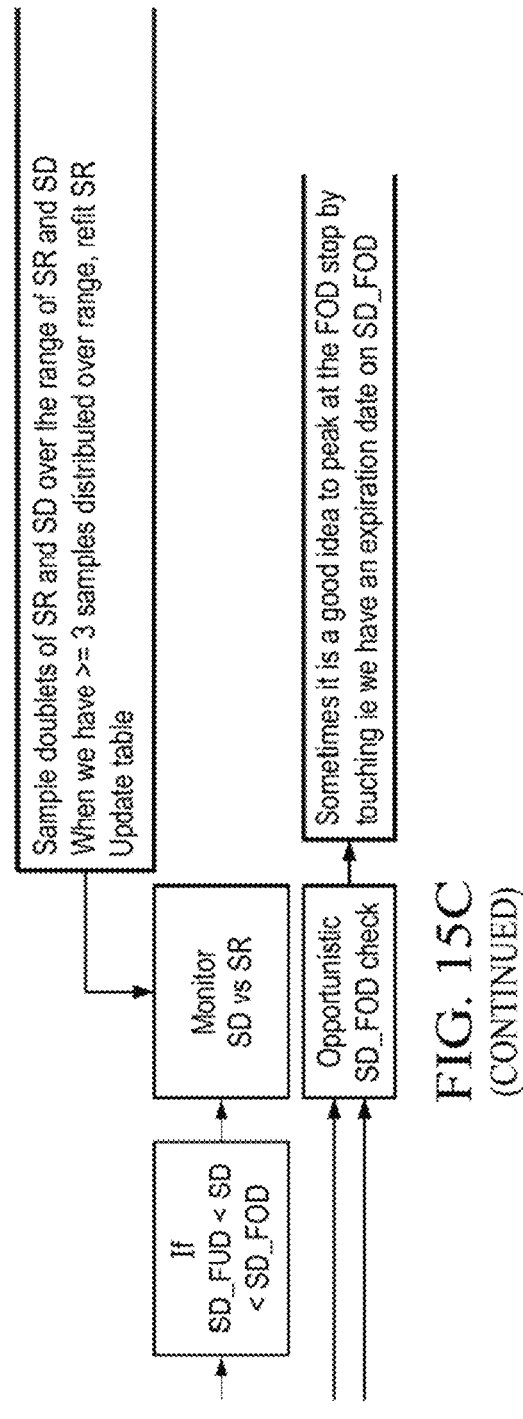
Figure 15D:
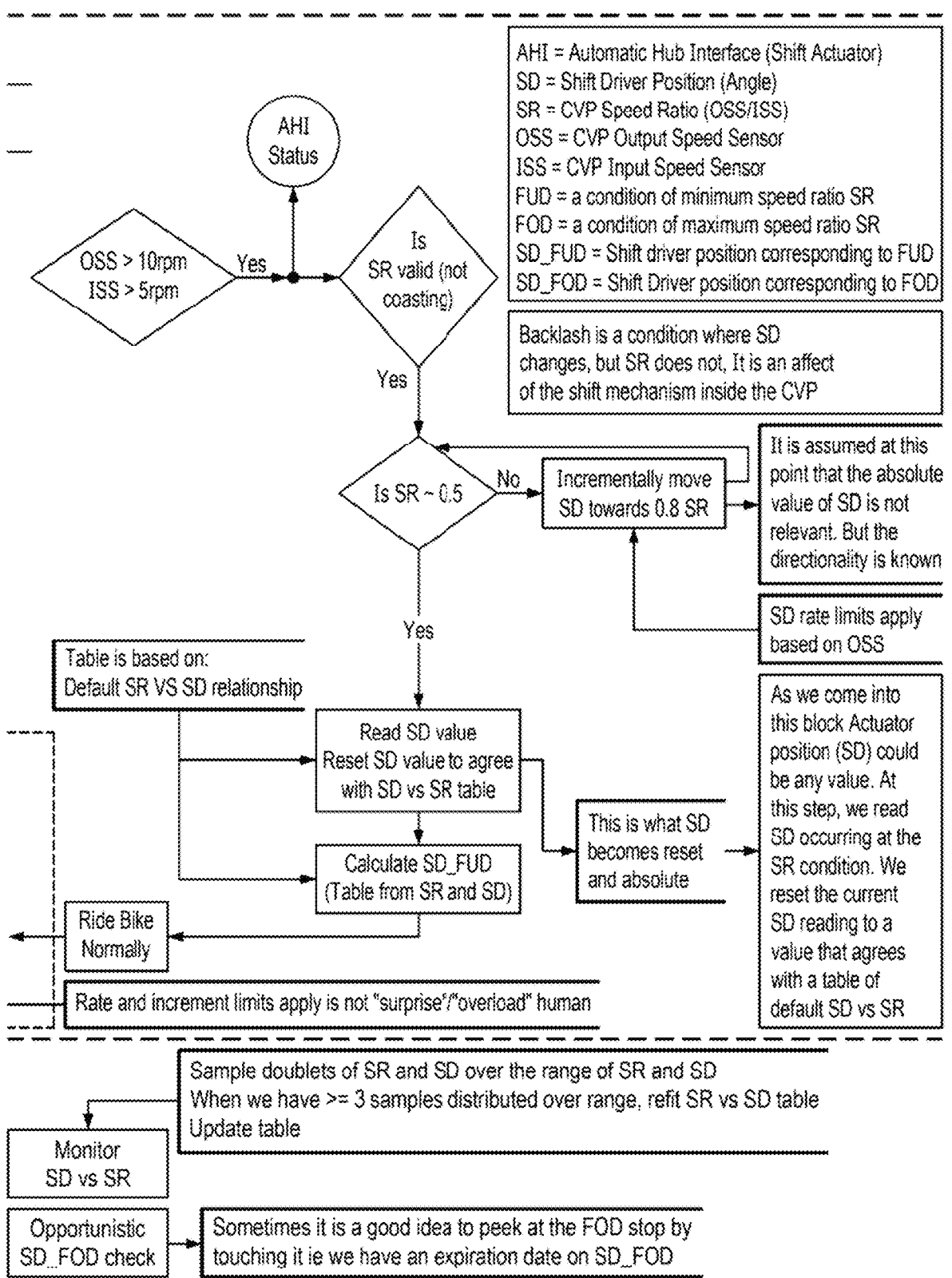
Figure 16A:
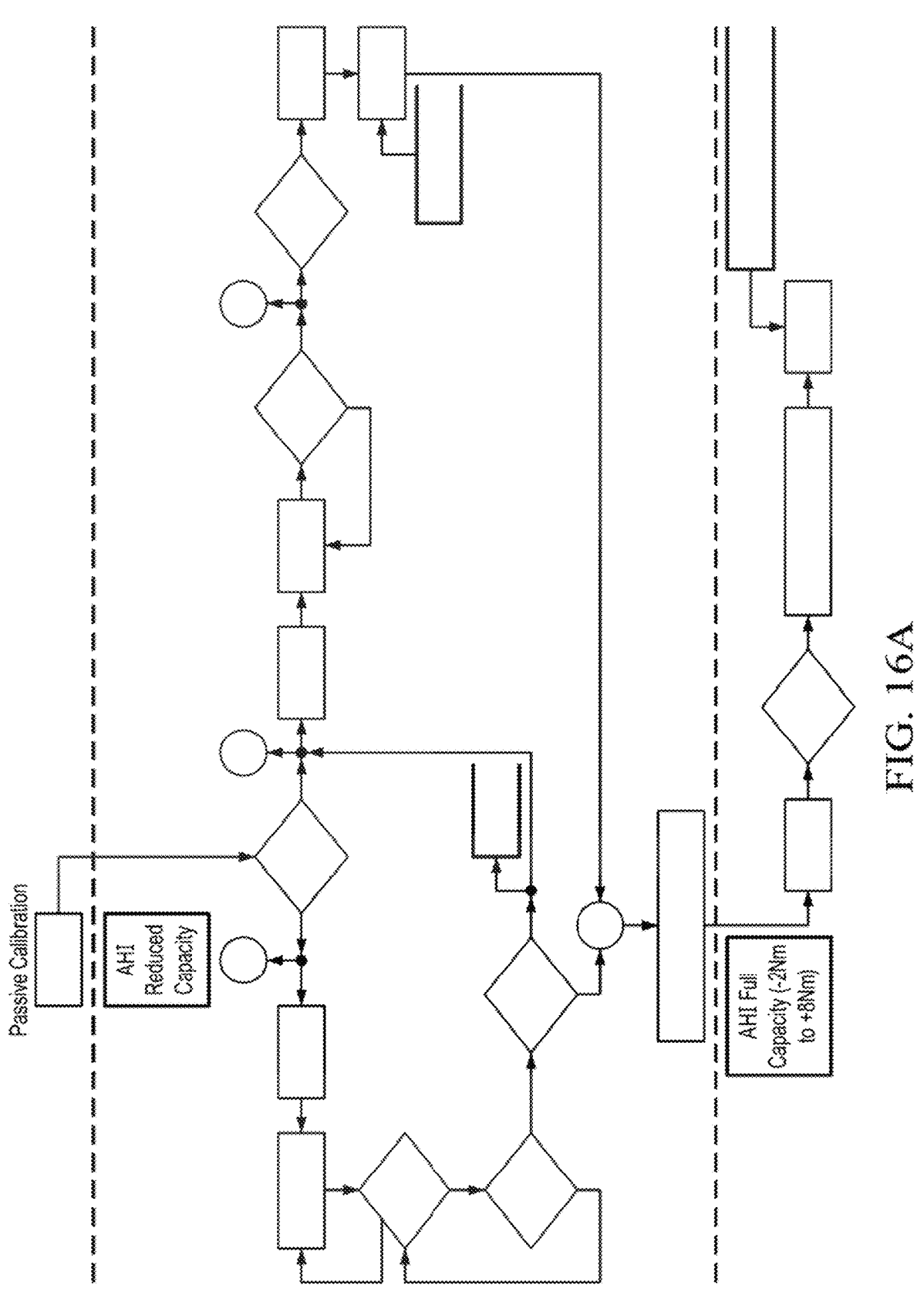
Figure 16B:
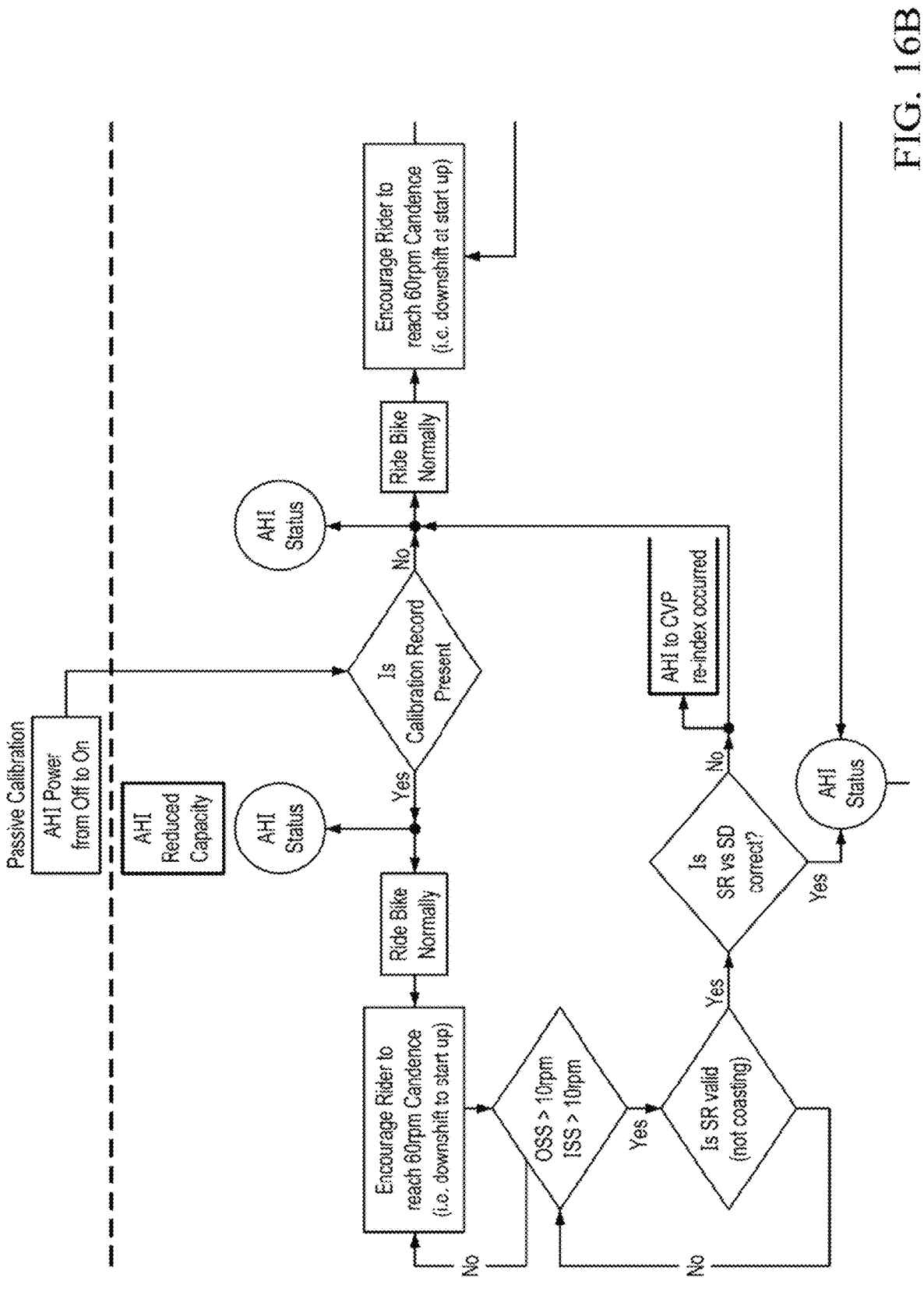
Figure 16B:
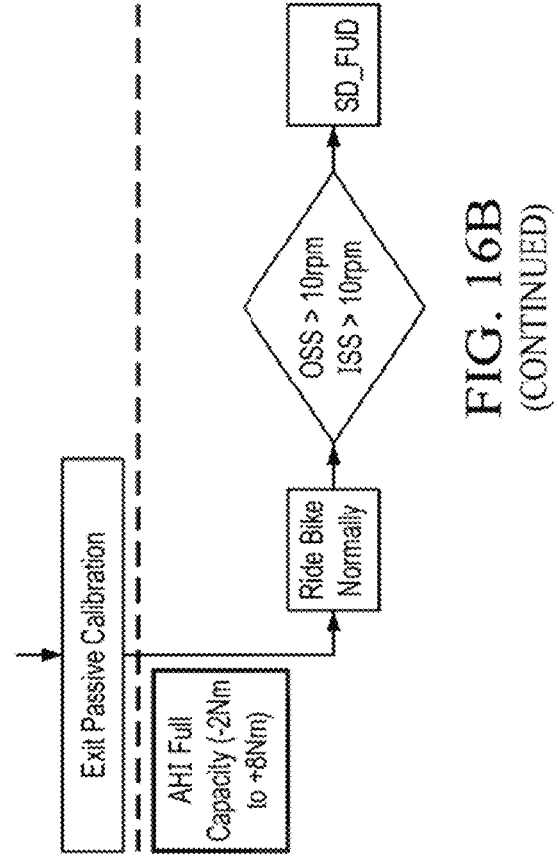
Figure 16C:
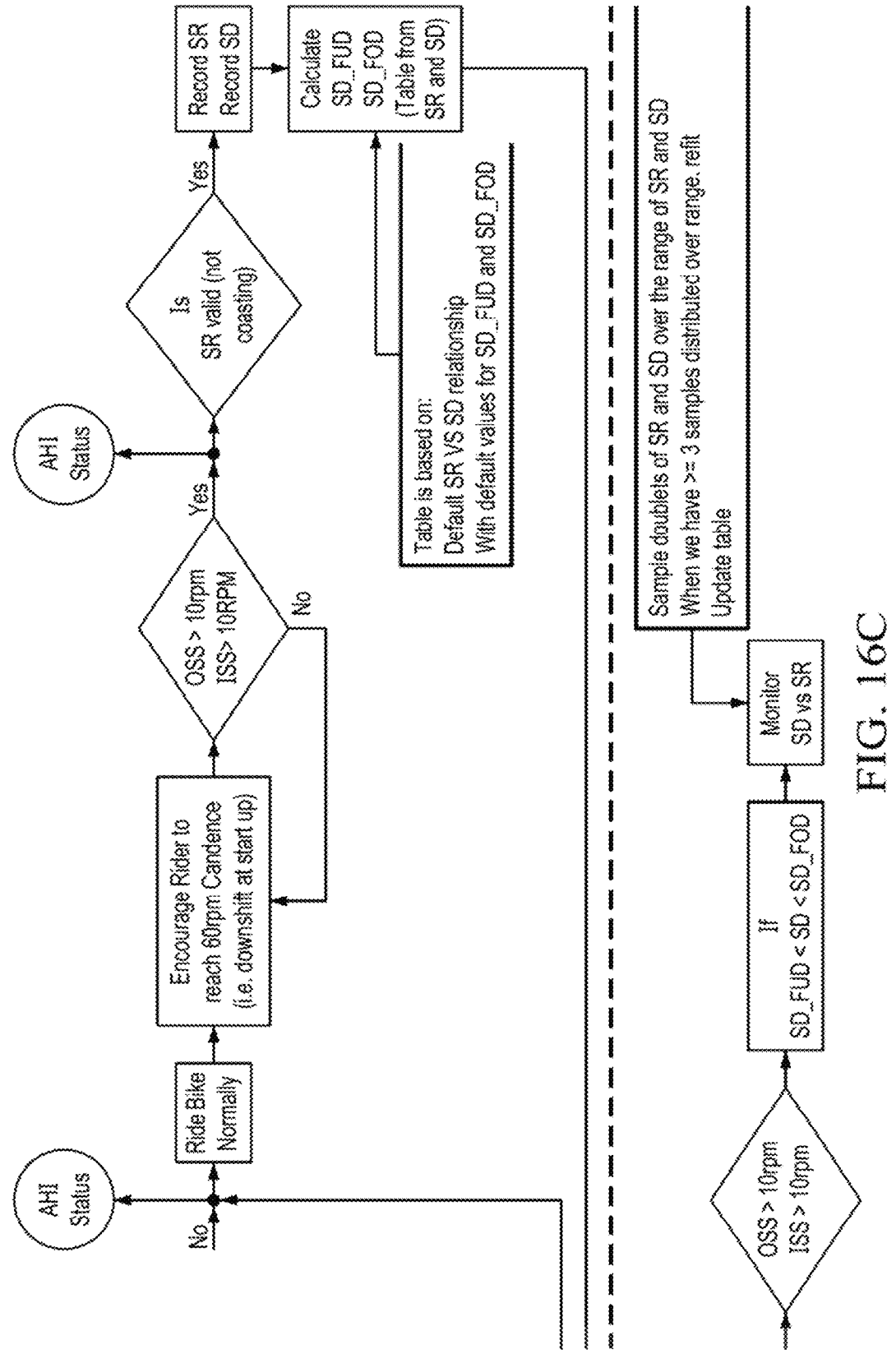

The FOD obtaining engine 906 may obtain or verify a software stop corresponding to a FOD position. The FOD obtaining engine 906 may monitor a current rise while rotating the shift driver towards FOD. An example relationship between input torque of the shift driver and a transmission speed ratio is illustrated in FIG. 12. If current is increasing but transmission speed ratio stops increasing and remains constant, at that point, the FOD is reached. The FOD obtaining engine 906 may record that shift driver position as a software stop. The benefits of such a detection of software stops at FOD and FUD include a utilization of the complete available ratio range for that specific CVP, a reduction of unnecessary shift driver rotation during backlash, an ability to detect reindexing events without involving a user, and avoiding calibration until an initial time at which the user begins riding the vehicle. Between the FUD and the FOD positions, full AHI servo motor torque may be utilized or implemented. If the shift driver position were to move outside of, or exceed, the software SFOD position, AHI servo motor torque may be reduced to some value, such as any value between 3 and 5 Newton-meters (Nm). In between the FUD and FOD, AHI electrical current may increase incrementally as long as thermal limits, current limits, and mechanical limits are followed.

When the shift driver is near the software SFOD or the software SFUD positions, a permitted rate of change of the shift driver, or AHI servo motor current applied by the AHI 202, may be reduced in order to prevent overloading, cracking, or otherwise deforming a shift mechanism. A permitted rate of change of the shift driver may be higher when approaching the SFOD compared to approaching the SFUD because CVP input torque adds to torque of the AHI 202 when applied against the FUD stop but subtracts from the AHI 202 when applied against the FOD stop.

A speed ratio obtaining buffer storage 903 may include hardware, software and/or firmware configured to store information and/or metadata obtained by the speed ratio obtaining engine 902. For example, the information may include information or logs of any transmission speed ratios obtained in a range of between 0.7 to 0.9 or approximately 0.8. A FUD obtaining buffer 905 may include hardware, software and/or firmware configured to store information and/or metadata obtained by the FUD obtaining engine 904. For example, the information may include FUD stop positions. A FOD obtaining buffer 907 may include hardware, software and/or firmware configured to store information and/or metadata obtained by the FOD obtaining engine 906. For example, the information may include FOD stop positions. However, this information in the speed ratio obtaining buffer storage 903, the FUD obtaining buffer 905, and the FOD obtaining buffer 907 may not be retrieved or utilized upon assembly, reassembly, or reindexing of the CVP hub 251 or the AHI 202. For example, the speed ratio obtaining engine 902 may repeat the process of determining shift driver position corresponding to a speed ratio of approximately 0.8, or between 0.7 and 0.9, without reverting back to a previously determined shift driver position.

FIGS. 13A-13C, 14A-14C, 15A-15D, and 16A-16C illustrate different concepts of passive calibration. The figures are refining concepts of a pre-defined sequence of events that "automatically" or "passively" occur depending on the state of the CVP system in order to establish key aspects of calibration, namely establishing the relationship between speed ratio and actuator (AHI or shift driver) absolute position from previously unknown conditions, as well as establishing allowed FUD and FOD travel limits. Depending on whether a calibration record exists, automated steps are implemented to put the shift mechanism near FUD, but not in backlash as the starting point of establishing the shift driver absolute position, whilst also being transparent to the system user (bike rider).

Figure 17A:
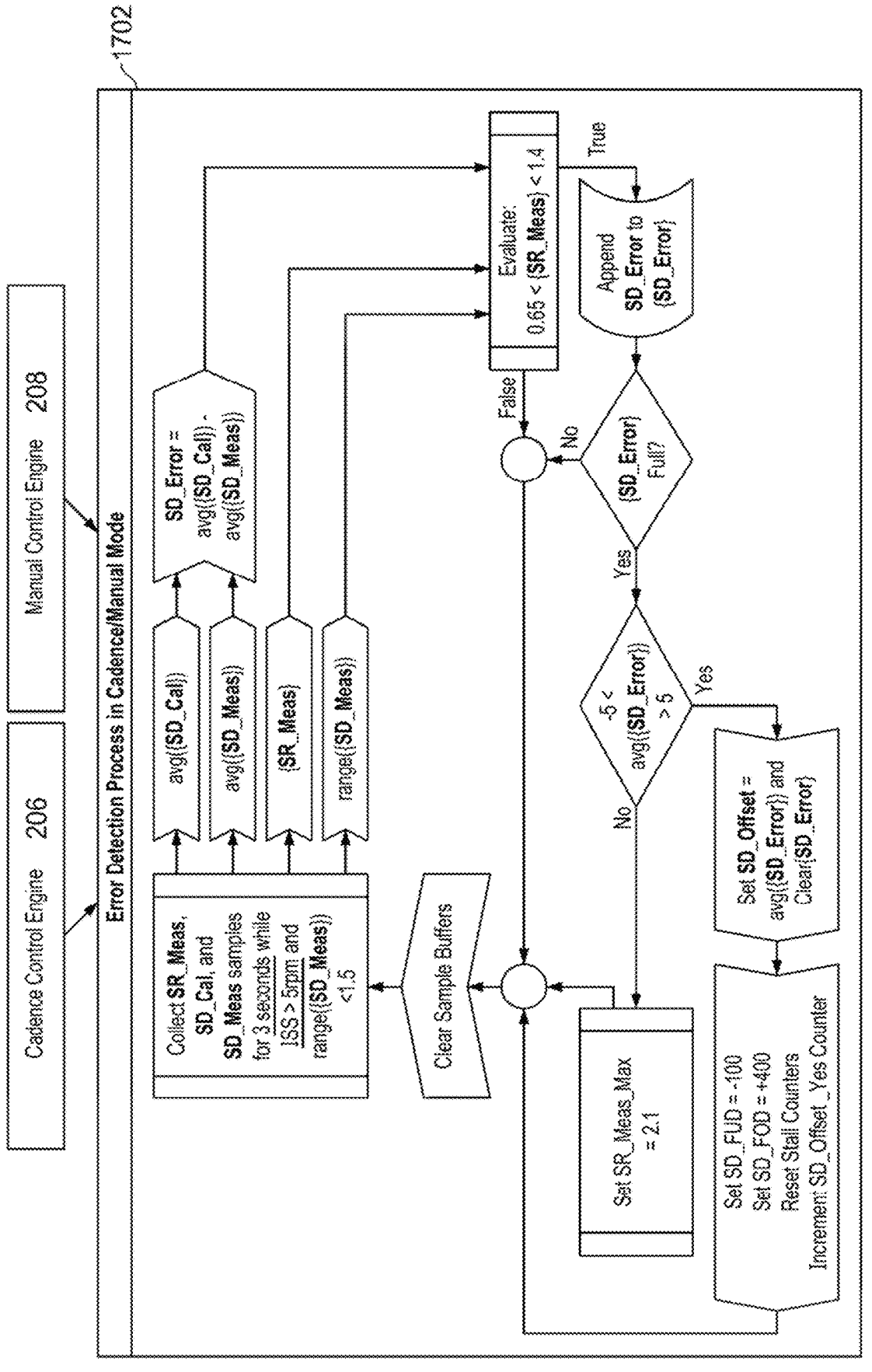
Figure 17D:
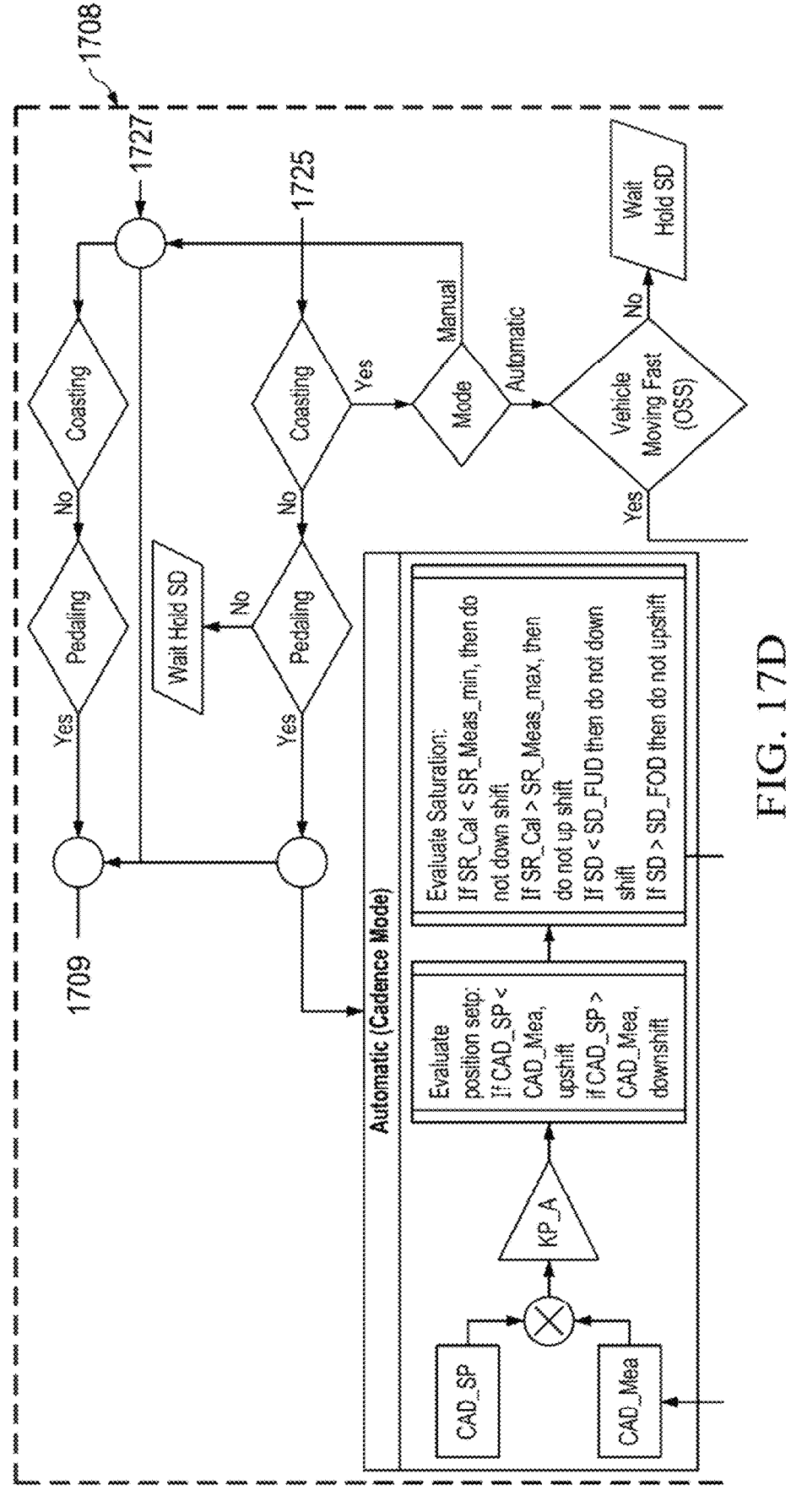
Figure 17D:
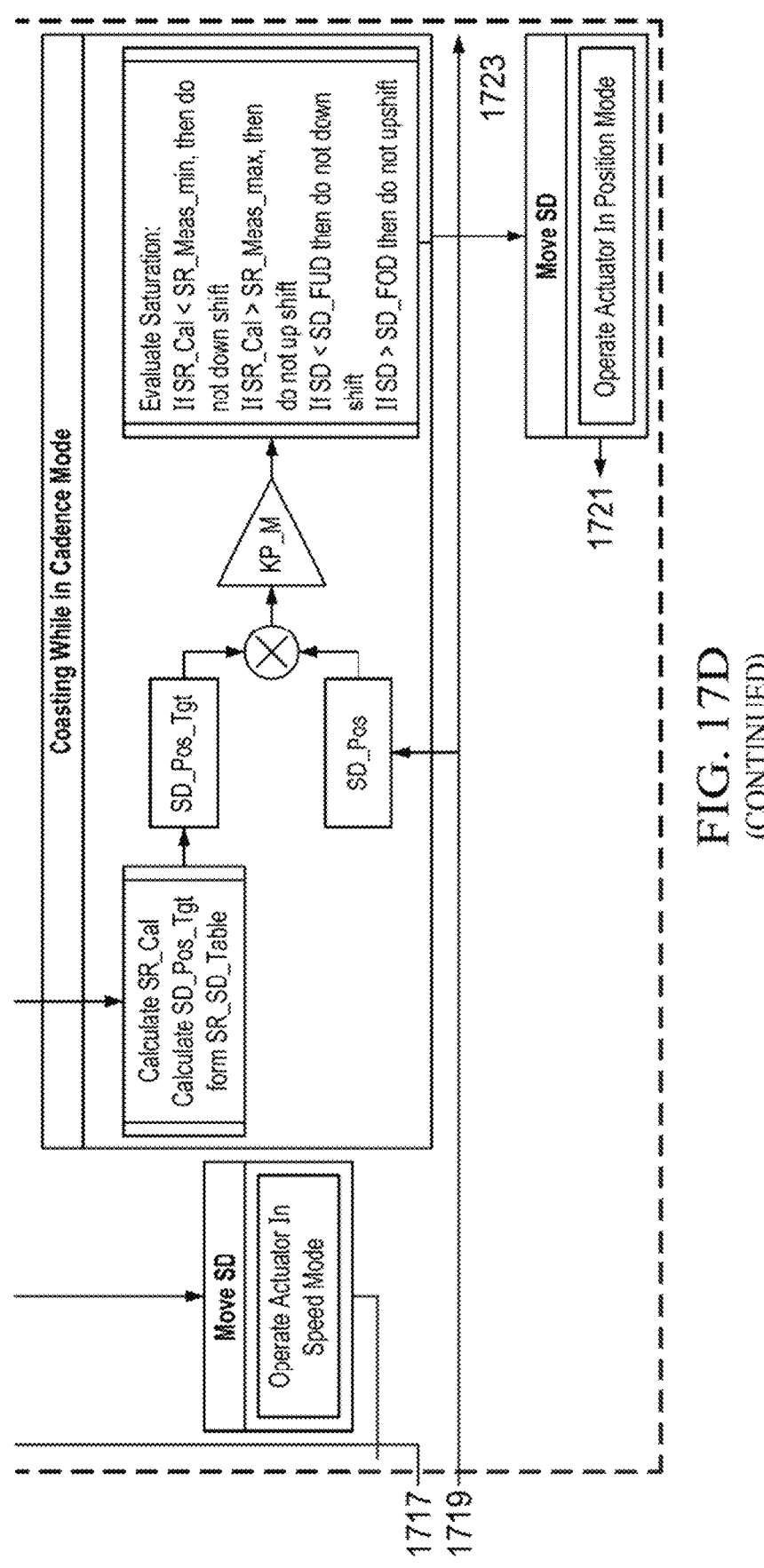
Figure 17E:
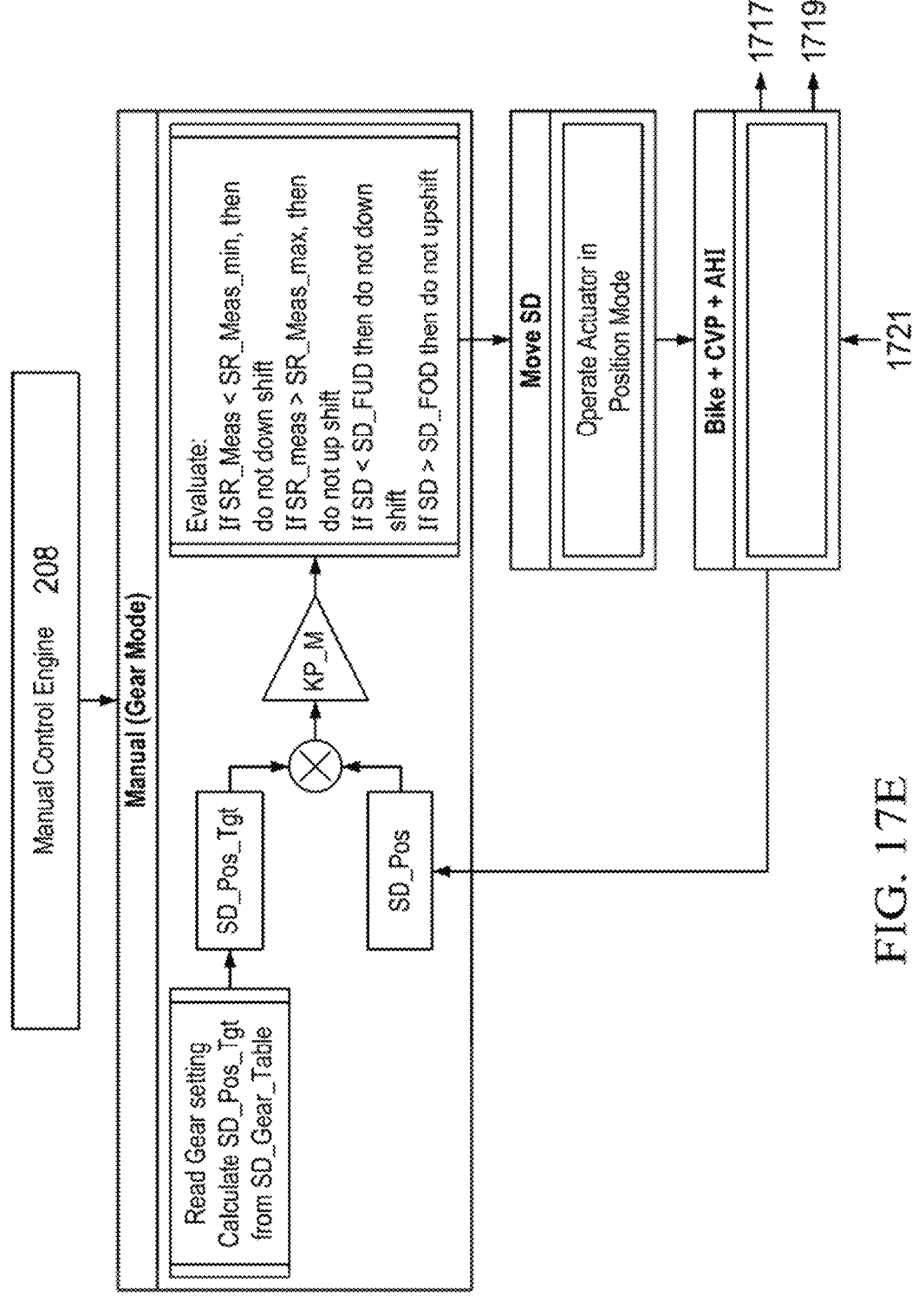
Figure 17F:
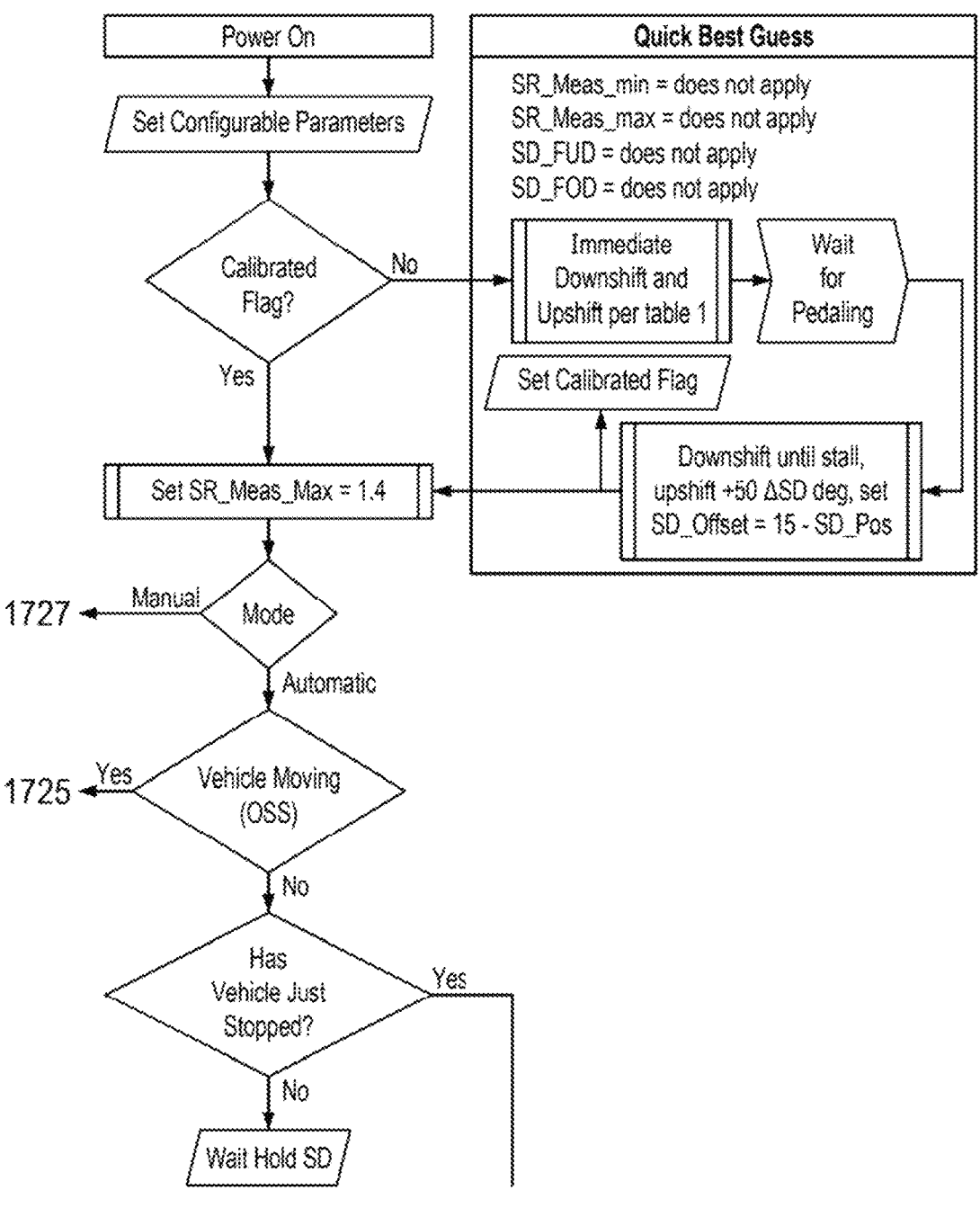
Figure 17F:
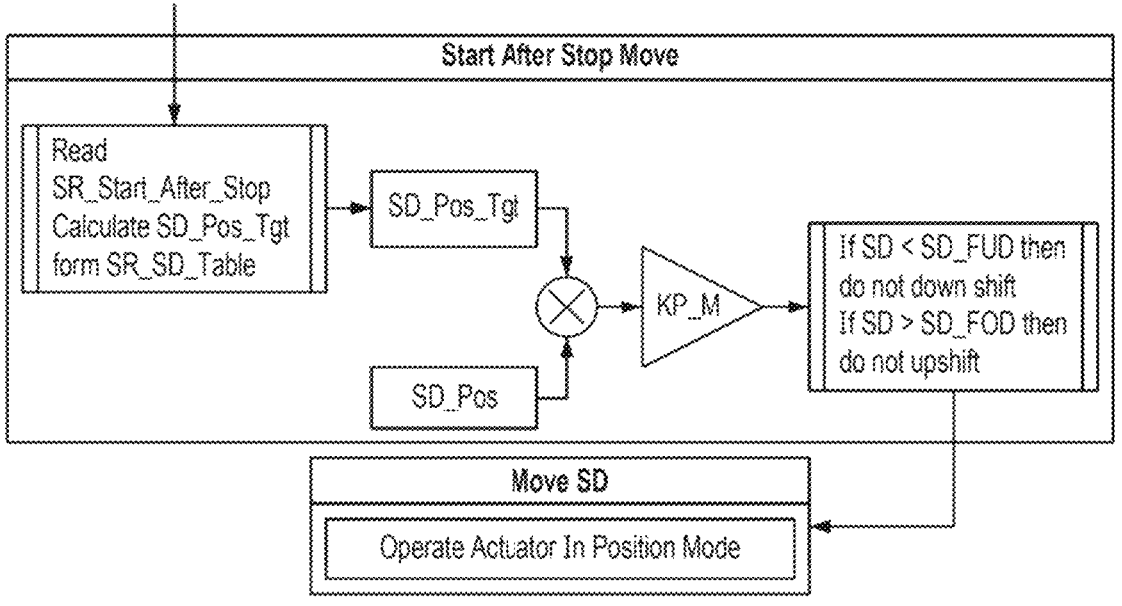
Figure 17G:
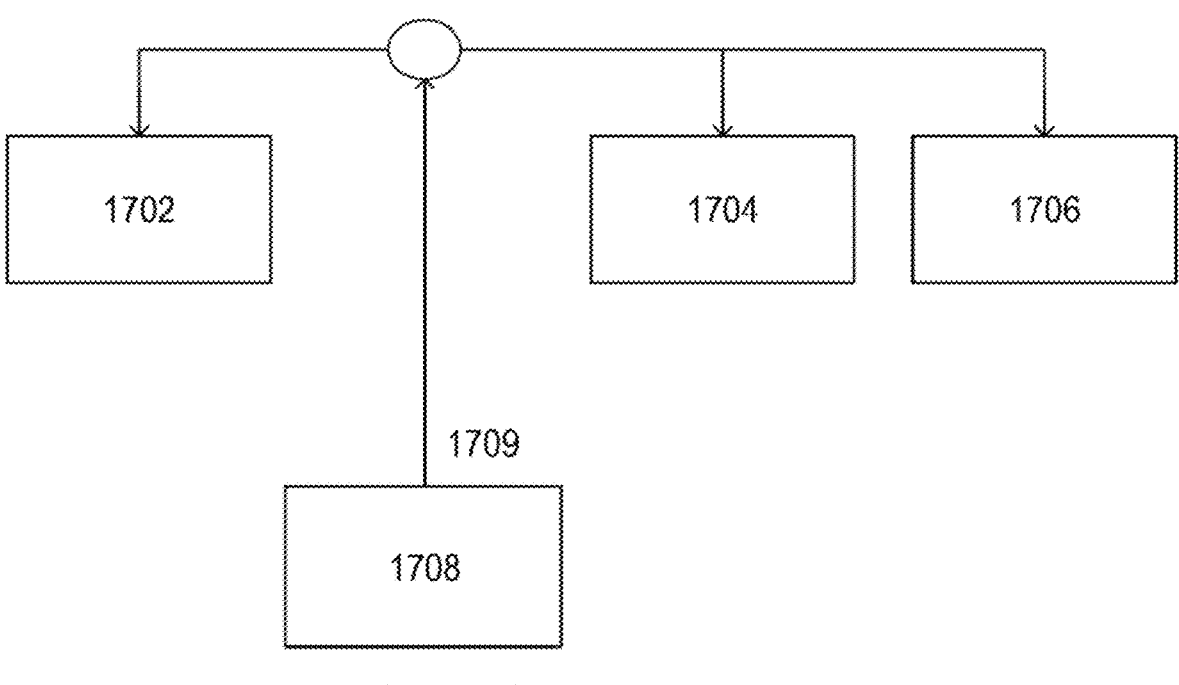

FIGS. 17A-17H illustrate modes of "active passive" error detection, active end stop detection at FOD, FUD, manual mode, cadence mode, and start after stop operations. FIG. 17A illustrates an error detection process 1702 in cadence or manual mode. FIG. 17B illustrates an active end stop detection process 1704 at a FOD. FIG. 17C illustrates an active end stop detection process 1706 at a FUD. FIG. 17D illustrates a cadence mode process 1708, including a connection 1709 to the error detection process 1702, the active end stop detection process 1704, and/or the active end stop detection process 1706. A connection 1717 is from the "Bike+CVP+AHI" illustrated in FIG. 17E to the CAD_Mea box within an automatic cadence mode process. CAD_Mea indicates a quotient of input speed sensor divided by cog ratio. A connection 1719 is from the "Bike+CVP+AHI" illustrated in FIG. 17E to the "SD_Pos" in a coasting while in cadence mode process. A connection 1723 goes to the SD_Pos in the start after stop move process illustrated in FIG. 17F. A connection 1721 extends from the Move shift driver process to the "Bike+CVP+AHI" illustrated in FIG. 17E. A connection 1725 extends from a vehicle moving (OSS) decision box illustrated in FIG. 17F to the coasting decision box in FIG. 17D. A connection 1727 extends from the mode decision box illustrated in FIG. 17F, specifically, if the decision is a manual mode. FIG. 17G illustrates connections between the error detection process 1702 in cadence or manual mode, the active end stop detection process 1704 at a FOD, the active end stop detection process 1706 at a FUD, and cadence mode process 1708 at the connection 1709.

Figure 18:
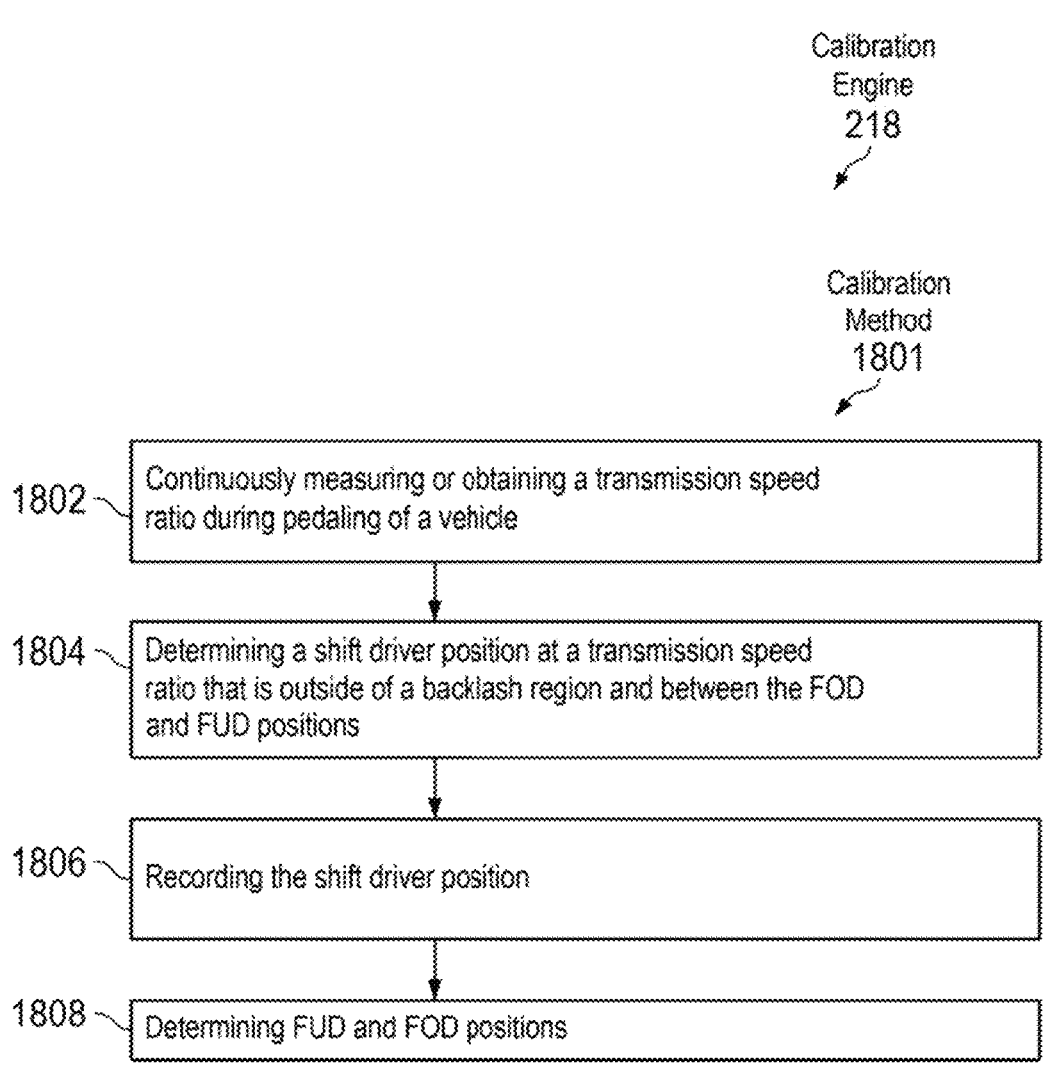
FIG. 18 is a is a flowchart of a calibration method, in accordance with some embodiments of the present invention, in accordance with some embodiments of the present invention.

FIG. 18 is a flowchart of a calibration method 1801, consistent with FIG. 9 and being performed by the AHI 202, in particular, by the calibration engine 218. In particular, the calibration method may begin at step 1802, in which a position of a shift driver (e.g., the shift driver 232) corresponds to a FUD backlash region. For example, a mechanical stop of the C1 carrier may have been contacted. In some examples, at this point, a transmission speed ratio may be approximately 0.5. The calibration engine 218 may perform an upshifting to increase the transmission speed ratio, which entails moving the shift driver, while continuously monitoring the transmission speed ratio. At step 1804, the calibration engine 218 may determine when the transmission speed ratio reaches a certain value. Once the transmission speed ratio reaches a certain value, the calibration engine 218 may record a position of a shift driver at step 1806. At this position, the AHI 202 is outside of the backlash region corresponding to FUD. In some examples, this transmission speed ratio may reach a value of 0.8, or any value between 0.7 and 0.9, 0.6 to 1, 0.55 to 1.05, or any suitable value that is removed from the backlash region but does not require strenuous or uncomfortable pedaling. From this position, the calibration engine 218 may determine FUD and FOD positions (e.g., software stops that are outside of backlash or saturation regions) in step 1808 according to a table. Thus, the calibration engine 218 may calibrate by acquiring only one data point of the transmission speed ratio and position of the shift driver. Furthermore, the calibration engine 218 may further verify the FUD and FOD positions by actively monitoring a shift driver position compared to a transmission speed ratio during pedaling of the vehicle, to determine at which shift driver position backlash commences. For example, upon detecting that an incremental change in a shift driver rotation does not result in an incremental decrease in transmission speed ratio, the calibration engine may determine that point as the FUD position. Meanwhile, to obtain the FOD position, the calibration engine 218 may monitor a current rise while rotating the shift driver towards FOD by increasing the transmission speed ratio. If current is increasing but transmission speed ratio stops increasing and remains constant, at that point, the calibration engine determines the FOD position.

Figure 19:
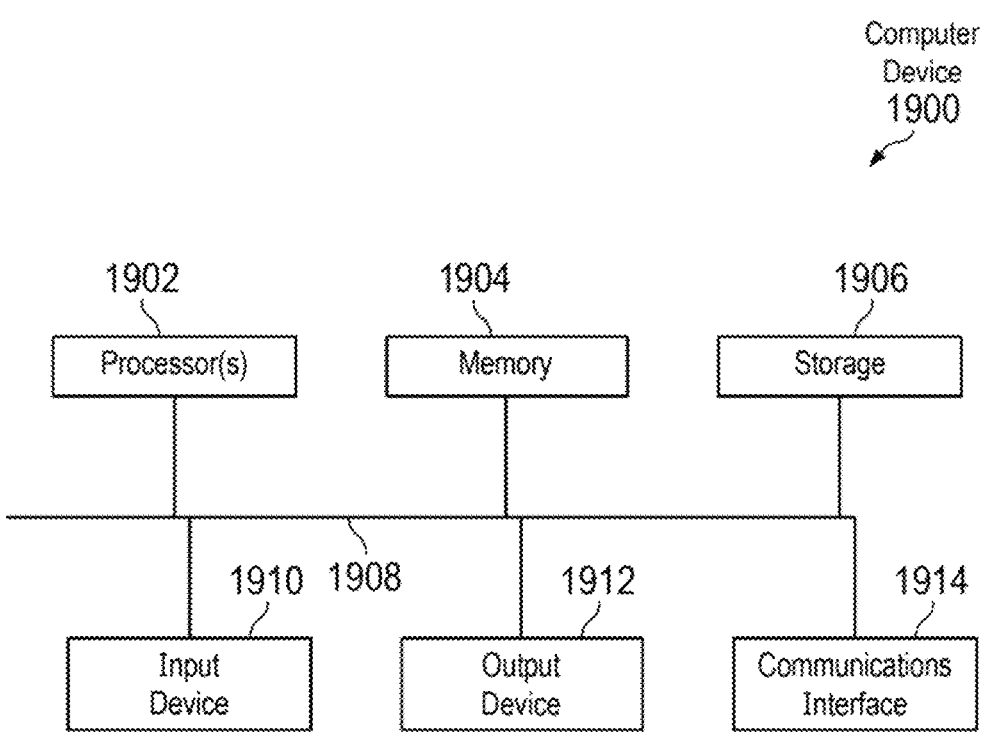
FIG. 19 is a block diagram illustrating details of a computing system which may be implemented with the AHI.

FIG. 19 is a block diagram of a computing device 1900, in accordance with some embodiments. In some embodiments, the computing device 1900 may be a particular implementation of the client device 162 and/or of the one or more of the processing servers 101, and may perform some or all of the functionality described herein. The computing device 1900 comprises one or more hardware processor 1902, memory 1904, storage 1906, an input device 1910, and output device 1912 and/or a communications interface 1914, all communicatively coupled to a communication channel 1908.

The one or more hardware processors 1902 may be configured to execute executable instructions (e.g., software programs, applications). In some example embodiments, the one or more hardware processors 1902 comprises circuitry or any processor capable of processing the executable instructions.

The memory 1904 stores working data. The memory 1904 any include devices, such as RAM, ROM, RAM cache, virtual memory, etc. In some embodiments, the data within the memory 1904 may be cleared or ultimately transferred to the storage 1906 for more persistent retention. The term "memory" herein is intended to cover all data storage media whether permanent or temporary.

The storage 1906 includes any persistent storage device. The storage 1906 may include flash drives, hard drives, optical drives, cloud storage, magnetic tape and/or extensible storage devices (e.g., SD cards). Each of the memory 1904 and the storage 1906 may comprise a computer-readable medium, which stores instructions or programs executable by one or more hardware processors 1902.

The input device 1910 may include any device capable of receiving input information (e.g., a mouse, keyboard, microphone, etc.). The output device 1912 includes any device capable of outputting information (e.g., speakers, screen, etc.).

The communications interface 1914 may include any device capable of interfacing with external devices and/or data sources. The communications interface 1914 may include an Ethernet connection, a serial connection, a parallel connection, and/or an ATA connection. The communications interface 1914 may include wireless communication (e.g., 802.11, WiMax, LTE, 5G, WiFi) and/or a cellular connection. The communications interface 1914 may support wired and wireless standards.

A computing device 1900 may comprise more or less hardware, software and/or firmware components than those depicted (e.g., drivers, operating systems, touch screens, biometric analyzers, battery, APIs, global positioning systems (GPS) devices, various sensors and/or the like). Hardware elements may share functionality and still be within various embodiments described herein. In one example, the one or more hardware processors 1902 may include a graphics processor and/or other processors.

An "engine," "system," "datastore," and/or "database" may comprise hardware, software, firmware, and/or circuitry. In one example, one or more software programs comprising instructions capable of being executable by a hardware processor may perform one or more of the functions of the engines, datastores, databases, or systems described herein. Circuitry may perform the same or similar functions. The functionality of the various systems, engines, datastores, and/or databases may be combined or divided differently. Memory or storage may include cloud storage. The term "or" may be construed as inclusive or exclusive. Plural instances described herein may be replaced with singular instances. Memory or storage may include any suitable structure (e.g., an active database, a relational database, a self-referential database, a table, a matrix, an array, a flat file, a documented-oriented storage system, a non-relational No-SQL system, and the like), and may be cloud-based or otherwise.

At least some of the operations of a method may be performed by the one or more hardware processors. The one or more hardware processors may operate partially or totally in a "cloud computing" environment or as a "software as a service" (SaaS). For example, some or all of the operations may be performed by a group of computers being accessible via a network (e.g., the Internet) and via one or more appropriate interfaces (e.g., one or more APIs).

The performance of certain of the operations may be distributed among various hardware processors, whether residing within a single machine or deployed across a number of machines. In some embodiments, the one or more hardware processors or engines may be located in a single geographic location (e.g., within a home environment, an office environment, or a server farm). In some embodiments, the one or more hardware processors or engines may be distributed across a number of geographic locations.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting.

The invention claimed is:

1. A continuous variable planetary (CVP) system for a vehicle, the CVP system comprising:

a CVP hub configurable to operate across a range of transmission speed ratios, the CVP hub including:

a set of tiltable planet assemblies including a set of tiltable planets, such that a tilt of the set of tiltable planets controls a transmission speed ratio of the range of transmission speed ratios; and a shift driver configured to modify the tilt of the set of tiltable planets to shift the CVP hub across the range of transmission speed ratios; and an automatic hub interface (AHI) configured to control the shift driver, the AHI including:

memory storing calibration settings for the AHI, the calibration settings including calibration information to assist the AHI to move the shift driver to a shift driver position associated with a transmission speed ratio within the range of transmission speed ratios, the calibration settings including a software full underdrive (FUD) position of the CVP hub, the software FUD being before a mechanical FUD position of the CVP hub, the calibration settings further including a software full overdrive (FOD) position of the CVP hub, the software FOD being before a mechanical FOD position of the CVP hub;

one or more hardware processors; and memory storing computer instructions, the computer instructions when executed by the one or more hardware processors configured to perform:

determining a desired transmission speed ratio within the range of transmission speed ratios;

using the calibration information to move the shift driver to a particular shift driver position corresponding to the desired transmission speed ratio;

determining if the position of the shift driver is approaching the software FOD position or software FUD position, and if so limiting a rate of change of the shift driver position as the shift driver approaches the software FOD position or the software FUD position to prevent damage to the CVP hub; and preventing the shift driver position from passing a threshold corresponding to the software FOD position or the software FUD position.

2. The CVP system of claim 1, wherein the vehicle is a bicycle.

3. The CVP system of claim 1, wherein the AHI includes a calibration engine configured to generate the calibration settings.

4. The CVP system of claim 3, wherein the calibration engine is configured to generate the calibration settings upon detecting a calibration event.

5. The CVP system of claim 3, wherein the calibration engine is configured to generate the software FUD position and the software FOD position.

6. The CVP system of claim 3, wherein the calibration information includes a mapping of shift driver position to speed ratio.

7. The CVP system of claim 6, wherein the calibration information includes an offset value to the mapping of the shift driver position to the speed ratio.

8. The CVP system of claim 7, wherein the calibration engine is configured to generate the offset value by evaluating the shift driver position and an actual transmission speed ratio calculated from sensors on the vehicle.

9. The CVP system of claim 7, wherein the calibration engine is configured to generate the software FUD position or the software FOD position by iteratively comparing the shift driver position relative to an increase or decrease in an actual transmission speed ratio.

10. A method of controlling a continuous variable planetary (CVP) hub of a CVP system for a vehicle, the CVP hub configurable to operate across a range of transmission speed ratios, the CVP hub including a set of tiltable planet assemblies including a set of tiltable planets, such that a tilt of the set of tiltable planets controls a transmission speed ratio of the range of transmission speed ratios, the CVP hub further including a shift driver configured to modify the tilt of the set of tiltable planets to shift the CVP hub across the range of transmission speed ratios, the method comprising:

storing calibration settings for an automatic hub interface (AHI) configured to control the shift driver, the calibration settings including calibration information to assist the AHI to move the shift driver to a shift driver position associated with a transmission speed ratio within the range of transmission speed ratios, the calibration settings including a software full underdrive (FUD) position of the CVP hub, the software FUD being before a mechanical FUD position of the CVP hub, the calibration settings further including a software full overdrive (FOD) position of the CVP hub, the software FOD being before a mechanical FOD position of the CVP hub;

determining a desired transmission speed ratio within the range of transmission speed ratios;

using the calibration information to move the shift driver to a particular shift driver position corresponding to the desired transmission speed ratio;

determining if the position of the shift driver is approaching the software FOD position or software FUD position, and if so limiting a rate of change of the shift driver position as the shift driver approaches the software FOD position or the software FUD position to prevent damage to the CVP hub; and preventing the shift driver position from passing a threshold corresponding to the software FOD position or the software FUD position.

11. The method of claim 10, wherein the vehicle is a bicycle.

12. The method of claim 10, further comprising using a calibration engine to generate the calibration settings.

13. The method of claim 12, further comprising using the calibration engine to generate the calibration settings upon detecting a calibration event.

14. The method of claim 12, further comprising using the calibration engine to generate the software FUD position and the software FOD position.

15. The method of claim 12, wherein the calibration information includes a mapping of shift driver position to speed ratio.

16. The method of claim 15, wherein the calibration information includes an offset value to the mapping of the shift driver position to the speed ratio.

17. The method of claim 16, further comprising using the calibration engine to generate the offset value by evaluating the shift driver position and an actual transmission speed ratio calculated from sensors on the vehicle.

18. The method of claim 16, further comprising using the calibration engine to generate the software FUD position or the software FOD position by iteratively comparing the shift driver position relative to an increase or decrease in an actual transmission speed ratio.

* * * * *